United States Patent
Jeong et al.

(10) Patent No.: US 10,621,027 B2
(45) Date of Patent: Apr. 14, 2020

(54) IT SYSTEM FAULT ANALYSIS TECHNIQUE BASED ON CONFIGURATION MANAGEMENT DATABASE

(71) Applicant: TMAXSOFT CO., LTD., Gyeonggi-do (KR)

(72) Inventors: Daebeom Jeong, Gyeonggi-do (KR); Kyungkoo Yoon, Gyeonggi-do (KR)

(73) Assignee: TMAXSOFT CO., LTD., Gyeonggi-do (KR)

( * ) Notice: Subject to any disclaimer, the term of this patent is extended or adjusted under 35 U.S.C. 154(b) by 256 days.

(21) Appl. No.: 15/689,494

(22) Filed: Aug. 29, 2017

(65) Prior Publication Data
US 2019/0056983 A1    Feb. 21, 2019

(30) Foreign Application Priority Data

Aug. 18, 2017 (KR) .......................... 10-2017-0104513

(51) Int. Cl.
*G06F 11/07* (2006.01)
*G06F 16/901* (2019.01)

(52) U.S. Cl.
CPC .......... *G06F 11/079* (2013.01); *G06F 11/076* (2013.01); *G06F 11/0775* (2013.01); *G06F 16/9024* (2019.01)

(58) Field of Classification Search
CPC .. G06F 11/079; G06F 11/076; G06F 16/9024; G06F 11/0775
See application file for complete search history.

(56) References Cited

U.S. PATENT DOCUMENTS

| | | | |
|---|---|---|---|
| 2004/0049565 A1* | 3/2004 | Keller | G06F 11/0709 709/223 |
| 2017/0116061 A1* | 4/2017 | Patra | G06F 11/079 |
| 2017/0141945 A1 | 5/2017 | Giammaria et al. | |
| 2017/0185468 A1 | 6/2017 | Schimmelpfeng et al. | |
| 2018/0232648 A1* | 8/2018 | Acharya | G06N 7/005 |
| 2019/0294486 A1* | 9/2019 | Cheriton | G06F 16/248 |
| 2019/0318288 A1* | 10/2019 | Noskov | G05B 23/024 |

FOREIGN PATENT DOCUMENTS

| | | |
|---|---|---|
| KR | 10-2004-0062528 A | 7/2004 |
| KR | 10-2006-0013908 A | 2/2006 |
| KR | 10-2009-0018806 A | 2/2009 |
| KR | 10-2010-0133168 A | 12/2010 |
| WO | WO-03005200 A1 * | 1/2003 .......... G06F 11/0709 |

OTHER PUBLICATIONS

Gruschke, Boris, "Integrated event management: Event correlation using dependency graphs", 1998, Proceedings of the 9th IFIP/IEEE International Workshop on Distributed Systems: Operations and Management, pp. 1-12.*

* cited by examiner

*Primary Examiner* — Matthew M Kim
*Assistant Examiner* — Indranil Chowdhury
(74) *Attorney, Agent, or Firm* — Martin & Ferraro, LLP

(57) ABSTRACT

Disclosed is a management server for analyzing a root cause related with an abnormal situation in an IT system. This server has been made in an effort to analyze and present a root cause for a fault phenomenon which occurs in an IT system in order to satisfy a demand in the art. And the server has also been made in an effort to efficiently determine a potential fault related event in the IT system.

20 Claims, 11 Drawing Sheets

<NORMAL DISTRIBUTION GRAPH>
μ : MEAN (MEAN OF SAMPLE MEAN OR MEAN OF SAMPLE STANDARD DEVIATION)
σ : STANDARD DEVIATION (STANDARD DEVIATION OF SAMPLE MEAN
OR STANDARD DEVIATION OF SAMPLE STANDARD DEVIATION)

CI RELATION INFORMATION (HIERARCHY DEPTH <=2)

<CAUSALITY INFORMATION>     <CAUSALITY INFORMATION HAVING CONNECTION STRENGTH>

IT SYSTEM FAULT ANALYSIS TECHNIQUE BASED ON CONFIGURATION MANAGEMENT DATABASE

CROSS-REFERENCE TO RELATED APPLICATIONS

This application claims priority to and the benefit of Korean Patent Application No. 10-2017-0104513 filed in the Korean Intellectual Property Office on 18 Aug. 2017, the entire contents of which are incorporated herein by reference.

TECHNICAL FIELD

The present disclosure relates to a computer field, and more particularly, to Information Technology (IT) system fault analysis based on a configuration management database (CMDB).

BACKGROUND ART

Businesses of enterprises are rapidly expanding with explosive data growth and the emergence of diverse environments and platforms. As new business environments emerge, more efficient and flexible data services and information processing, and data management functions are needed. In response to these changes, a research is continued on databases to solve problems of high performance, high availability, a high failure recovery capability, and scalability which are foundations of corporate business implementation.

In general, the enterprises use a complicated computing environment constituted by various components including a server, a router, a cloud, a main frame, an application, and a personal computer (PC). In such an environment, an IT system used by the enterprises is configured by various combinations of multiple entities. The respective entities in the IT system may be dependent on each other. Herein, the "IT system" may mean a system for providing various IT services to a user. Further, the "entity" as the component constituting the IT system may include various levels of elements including the application in a unit system. In addition, the term "dependent on each other" means that performance of one entity may influence the performance of another entity.

Since the respective entities of the IT system operate dependently on each other, a fault event which occurs in one entity may concatenatively cause another fault in another entity. Therefore, when the fault occurs in a specific entity, there is an entity that provides a root cause that causes the fault. A technique that determines a root cause entity is a "root cause analysis (RAC)" technique.

In the meantime, various attempts have been made to develop the root cause analysis technique. One among them is an invention regarding a design method of causality model. The related art (Korean Patent Unexamined Application 10-2009-0018806) presents a causality model design method which may express causality of the entities of a system without the need for knowing an overall configuration of the system.

Another related art (Korean Patent Unexamined Application 10-2010-0133168) shows a system and a method that may define the causality which may be used for the root cause analysis from a correlation between application level entities.

The related art has the following disadvantages.

First, a lot of time and efforts of the user are required in defining the causality. In the related art, only when which causality (that is, the correlation including the causality) lower functions which may be included in the application have is defined by the user, causality information between the entities is usable in analyzing the fault root cause. A method that sets the causality defined by the user may increase a trouble of initial system design of the user.

Second, since the related art follows the user defined causality setting method, there is a great dependency on a technical knowledge which the user empirically learns. That is, the fact that the great dependency on the user's knowledge means that accuracy of the causality may vary depending on a skill of the technique and a depth of experience of the user. Accordingly, in this case, since a result for the causality analysis may vary depending on a level of the user, there is a large disadvantage in terms of stability of the system.

Third, the related art cannot flexibly cope with a change in configuration information of the system. When the configuration information of the system is changed, a mutual dependency relation between the entities may be changed. When the mutual dependency relation is changed, since the user needs to directly set the causality between the entities again, there is a disadvantage in that managing is not easy.

Accordingly, there is a need in the art for tracking and detecting a fault cause of the IT system by a more efficient method.

SUMMARY OF THE INVENTION

The present disclosure has been made in an effort to analyze and present a root cause for a fault phenomenon which occurs in an IT system in order to satisfy a demand in the art.

The present disclosure has also been made in an effort to efficiently determine a potential fault related event in the IT system.

An exemplary embodiment of the present disclosure provides a computer-readable medium including a computer program including encoded commands. When the computer program is executed by one or more processors, the computer program causes the one or more processors to perform operations for analyzing a root cause related with an abnormal situation in an IT system when the computer program is executed by the one or more processors of a computer system. The operations may include: an operation of detecting that an incident configuration item (CI) event for at least one of nodes to be monitored in the IT system occurs, wherein the nodes match CIs in a configuration management database (CMDB), respectively and the CMDB includes CIs and CI relation information; an operation of identifying an incident CI related with the incident CI event; an operation of deciding candidate CIs having a predetermined hierarchy depth from the identified incident CI based on CI relation information in the CMDB, wherein the hierarchy depth is associated with a distance between the CIs in the CI relation information; an operation of identifying candidate events which occur in the candidate CIs; an operation of deciding an occurrence time of each of the candidate events; an operation of deciding one or more analysis target events among the candidate events based on the decided occurrence time; an operation of generating event correlation information connecting the analysis target events to each other; an operation of deciding causality indicating a directional property for mutual connection of the analysis target events based on at least one of the CI relation information and the event correlation information in the CMDB; and an operation of analyzing a root cause for the incident CI event based on the causality in the event correlation information.

Another exemplary embodiment of the present disclosure provides a computer-implemented method for analyzing a root cause related with an abnormal situation in an IT system, which is performed by a computing device. The method may include: detecting that an incident configuration item (CI) event for at least one of nodes to be monitored in the IT system occurs, wherein the nodes match CIs in a configuration management database (CMDB), respectively and the CMDB includes CIs and CI relation information; identifying an incident CI related with the incident CI event; deciding candidate CIs having a predetermined hierarchy depth from the identified incident CI based on CI relation information in the CMDB, wherein the hierarchy depth is associated with a distance between the CIs in the CI relation information; identifying candidate events which occur in the candidate CIs; deciding the occurrence time of each of the candidate events; deciding one or more analysis target events among the candidate events based on the decided occurrence time; generating event correlation information connecting the analysis target events to each other; deciding causality indicating the directional property for mutual connection of the analysis target events included in the event correlation information based on the CI relation information in the CMDB; and analyzing a root cause for the incident CI event based on the causality in the event correlation information.

Yet another exemplary embodiment of the present disclosure provides a management server for analyzing a root cause related. with an abnormal situation in an IT system. The management server may include: a memory; and at least one processor connected with the memory. The at least one processor may be configured to perform the following steps and the steps may include: detecting that an incident configuration item (CI) event for at least one of nodes to be monitored in the IT system occurs, wherein the nodes match CIs in a configuration management database (CMDB), respectively and the CMDB includes CIs and CI relation information; identifying an incident CI related with the incident CI event; deciding candidate CIs having a predetermined hierarchy depth from the identified incident CI based on CI relation information in the CMDB, wherein the hierarchy depth is associated with a distance between the CIs in the CI relation information; identifying candidate events which occur in the candidate CIs; deciding the occurrence time of each of the candidate events; deciding one or more analysis target events among the candidate events based on the decided occurrence time; generating event correlation information connecting the analysis target events to each other; deciding causality indicating the directional property for mutual connection of the analysis target events included in the event correlation information based on the CI relation information in the CMDB; and analyzing a root cause for the incident CI event based on the causality in the event correlation information.

According to an exemplary embodiment of the present disclosure, a root cause for a fault phenomenon which occurs in an IT system can be analyzed and presented.

According to the exemplary embodiment of the present disclosure, a potential fault related event in the IT system can be efficiently determined.

BRIEF DESCRIPTION OF THE DRAWINGS

Various aspects are now described with reference to the drawings and like reference numerals are generally used to designate like elements. In the following exemplary embodiments, for a description purpose, multiple specific detailed matters are presented to provide general understanding of one or more aspects. However, it will be apparent that the aspect(s) can be executed without the specific detailed matters. In other examples, known structures and apparatuses are illustrated in a block diagram form in order to facilitate description of the one or more aspects.

DETAILED DESCRIPTION

Figure 1:
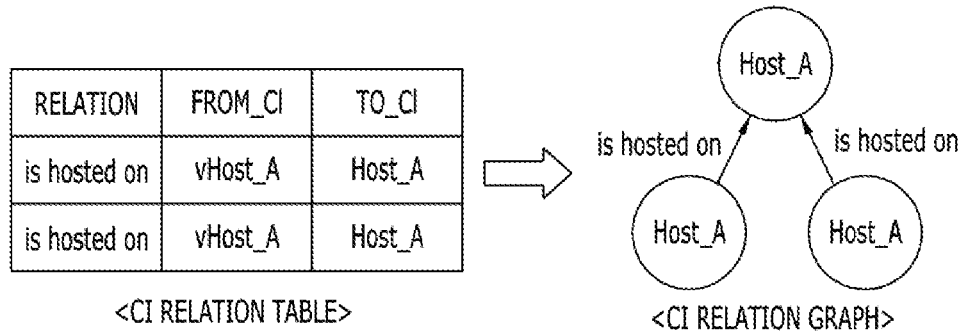
FIG. 1 illustrates an exemplary CI relation table and an exemplary CI relation information in a configuration management database (CMDB) according to an exemplary embodiment of the present disclosure.

Various exemplary embodiments and/or aspects will be now disclosed with reference to drawings. In the following description, for the purpose of a description, multiple detailed matters will be disclosed in order to help comprehensive appreciation of one or more aspects. However, those skilled in the art will recognize that the aspect(s) can be executed without the detailed matters. In the following disclosure and the accompanying drawings, specific exemplary aspects of one or more aspects will be described in detail. However, the aspects are exemplary and some of various methods in principles of various aspects may be used and the descriptions are intended to include all of the aspects and equivalents thereof.

Further, various aspects and features will be presented by a system which can include one or more apparatuses, terminals, servers, devices, components, and/or modules. It should also be appreciated and recognized that various systems can include additional apparatuses, terminals, servers, devices, components, and/or modules and/or that the various systems cannot include all of apparatuses, terminals, servers, devices, components, modules, and the like discussed in association with the drawings.

In "embodiment", "example", "aspect", "illustration", and the like used in the specification, it may not be construed that a predetermined aspect or design which is described is more excellent or advantageous than other aspects or designs. 'Component', 'module', 'system', 'interface', and the like which are terms used below generally mean computer-related entities and mean, for example, hardware, a combination of the hardware and software, or the software.

Moreover, the term "or" is intended to mean not exclusive "or" but inclusive "or". That is, when not separately specified or not clear in terms of a context, a sentence "X uses A or B" is intended to mean one of natural inclusive substitutions. That is, "X uses A or B" may be applied to all of the case where X uses A, the case where X uses B, and the case where X uses both A and B. Further, it should be understood that the term "and/or" used in the specification designates and includes all available combinations of one or more items among enumerated related items.

In addition, the word "comprises" and/or "comprising" means that the corresponding feature and/or component is present, but it should be appreciated that presence or addition of one or more other features, components, and/or a group thereof is not excluded. Further, when not separately specified or not clear in terms of the context that a singular form is indicated, it should be construed that a singular form generally means "one or more" in the present specification and the claims.

The computer-readable medium in the present specification may include all kinds of storage media storing programs and data so as to be readable by the computer system. The computer readable media in the present disclosure may include both computer readable storage media and computer readable transmission media. According to an aspect of the present disclosure, the computer readable storage media may include a read only memory (ROM), a random access memory (RAM), a compact disk (CD)-ROM, a digital video disk (DVD)-ROM, a magnetic tape, a floppy disk, an optical data storage device, and the like. Further, the computer readable transmission media may include a predetermined medium of a type which is transmittable, which is implemented in a type of a carrier wave (e.g., transmissions through the Internet). Additionally, the computer readable media are distributed to systems connected through network to store computer readable codes and/or commands in a distribution scheme.

Prior to describing detailed contents for carrying out the present disclosure, it should be noted that configurations not directly associated with the technical gist of the present disclosure are omitted without departing from the technical gist of the present disclosure. Further, terms or words used in the present specification and claims should be interpreted as meanings and concepts which match the technical spirit of the present disclosure based on a principle in which the inventor can define appropriate concepts of the terms in order to describe his/her invention by a best method.

FIG. 1 illustrates an exemplary CI relation table and an exemplary CI relation graph in a configuration management database (CMDB) according to an exemplary embodiment of the present disclosure.

In the present disclosure, an "IT management system" may mean an IT total solution system which monitors performance of an IT system configured by a combination of multiple individual entities to predict a fault in advance or analyze a fault cause in the future and present a solution of a problem to a user.

In the present disclosure, the CMDB may mean a database including configuration information of the IT system, The CMDB may include a configuration item (CI) representing the entity, and the like and CI relation information representing a relation between the configuration items. In the present disclosure, the CIs and the CI events may be used to be replaced with each other.

For example, as illustrated in FIG. 1, Host A which is a "physical host" CI and vHostA and vHostB which are "virtual host" CIs may be set as a relation of "is hosted on", which represents that a virtual host is hosted on a physical host. The CI relation information is information representing a connection relation between two or more CIs. When the CMDB is used, the configuration information and the relation information of the entire IT system may be expressed. The relation information may be expressed in the form of a graphical graph. The graphical graph may be referred to as "CI relation graph". A node in the CI relation graph may mean the CI and a line or connection may represent the relation between the CIs.

In the present disclosure, the "event" may mean an alarm indicating that the fault occurs in the each CI. The event includes an "explicit event" which occurs due to a rule explicitly set by the user and "a potential event" meaning abnormality, which occurs due to not the explicitly set rule but a statistical or predictive indicator.

For example, in respect to a rule that "when a CPU usage rate of Host A is more than 90%, the event is made to occur", the user may explicitly designate a limit line of 90% according to a measurement target (e.g., CPU). The event which occurs due to the explicitly designated rule is referred to as the explicit event.

However, the user's explicitly designating the rule with respect to all measurement targets in person is a Very tedious task. Further, since whether the rule is designated or a designation degree of the rule may vary depending on a skill level of the user, there may be insecurity in the IT system that relies on such an explicit event may vary depending on the skill level of the user. Accordingly, a series of techniques are required, which may make the potential event occur, through which may determine an abnormality degree of the system without user's explicitly designating the rule.

In the exemplary embodiment of the present disclosure, severity of an event which occurs may be distinguished according to the limit line (that is, a threshold) of the rule which becomes a basis to make the event occur. For example, as when the CPU usage rate of Host A is more than 80%, a "warning" event is made to occur and when the CPU usage rate of Host A is more than 90%, a "risk" event is made to occur, the severity of the event may be distinguished according to a the limit line (that is, threshold).

In the exemplary embodiment of the present disclosure, in some cases, the event may represent a phenomenon of a CI fault. In this case, an indicator expressing that the fault occurs may be referred to as "incident". The "incident" in the present disclosure is an indicator indicating that an event of a fault level occurs in the CI. Therefore, when the fault occurs in a specific CI, it may be indicated that the incident occurs. An "incident CI" in the present disclosure means a CI in which the fault (e.g., shutdown, etc.) occurs. Further, an "incident CI event" in the present disclosure may mean an event which is shown when the fault for the corresponding CI occurs, in addition, the incident in the present disclosure may mean a "phenomenon" in which the fault occurs, the incident CI may mean a "subject" in which the fault occurs, and the incident CI event may mean a "symptom" which is revealed when the fault occurs.

As described below, the present disclosure presents a new technique that performs the root cause analysis by using the CI relation information (e.g., CI relation graph). In the technique that performs the root cause analysis, a process of deriving "event correlation information (e.g., event correlation graph)" for connecting the CIs having the event correlation from the CI relation information CI relation graph), deriving "causality information (e.g., causality graph)" for connecting the CIs having a causality, and searching a root cause from the CI in which the problem occurs according to the event correlation information (e.g., event correlation graph to which the causality is reflected) may be performed.

According to exemplary embodiments of the present disclosure to be described below, user efforts for tracking the root cause based on the CMDB may be reduced. Further, user efforts for setting an occurrence rule of the explicit event may be reduced through a method for detecting the potential event. Additionally, according to the exemplary embodiments of the present disclosure, efficiency of the method for detecting the potential event and/or a method for searching the root cause of the incident (alternatively, event) may be enhanced.

Figure 2:
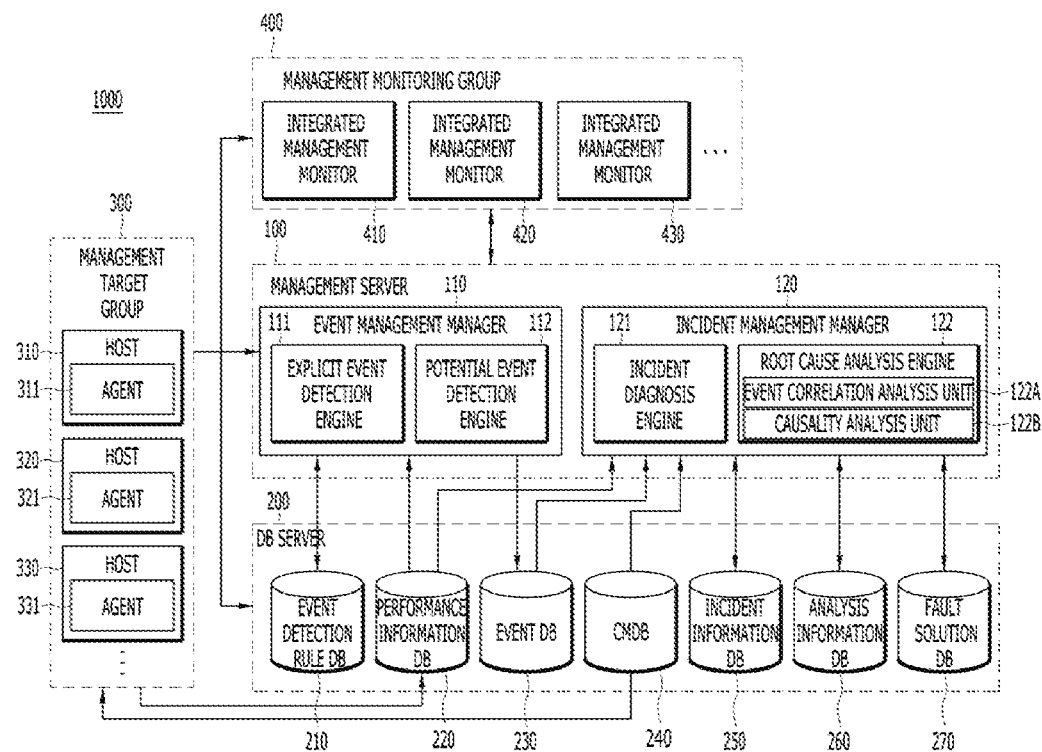
FIG. 2 exemplarily illustrates a management system according to an exemplary embodiment of the present disclosure.

FIG. 2 exemplarily illustrates a management system 1000 according to an exemplary embodiment of the present disclosure.

The management system and an IT management system in the present specification may be used to be replaced with each other. Components illustrated in FIG. 2 are just exemplary and additional components may be included or some of the components may be omitted. In an additional aspect of the present disclosure, the components illustrated in FIG. 2 may also be combined.

The management system 1000 in the present disclosure may include a management server 100, a DB server 200, a management target group 300, and a management monitoring group 400.

The management server 100 may include a predetermined type computer system or computer device such as a microprocessor, a mainframe computer, a digital processor, a portable device, and a device controller. The management server 100 may include a separate database management system (DBMS) and/or a persistent storage.

The persistent storage means a non-volatile storage medium which may consistently store predetermined data, such as a magnetic disk, an optical disk, and a magneto-optical storage device and a storage device based on a flash memory and/or a battery-backup memory. The persistent storage may communicate with the processor and the memory of the management server 100 through various communication means. In an additional exemplary embodiment, the persistent storage is positioned outside the management server 100 to communicate with the management server 100.

The management server 100 may include one or more memories including a buffer cache. Further, the management server 100 may include one or more processors. Accordingly, programs, managers, agents, engines, and/or components in the management server 100 may be operated by the processor on the memory.

Herein, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by control by the processor.

The management server 100 may collect performance information data acquired by measuring values of a performance indicator of the management target group 300 to be monitored during a predetermined period. For example, a potential event detection engine 112 of an event management manager 110 of the management server 100 may measure and/or collect performance information data. The collected performance information data may be stored in the DB server 200 (e.g., performance information DB 220). For example, the performance information data may be collected from agents 311, 321, and 331 of hosts 310, 321, and 331 of the management target group 300.

In another exemplary embodiment, the performance information data may be measured, collected, and stored by the DB server 200 (e.g., performance information DB 220). In this case, the management server 100 may receive the performance information data from the DB server 200.

The management server 100 generates windows for application to the performance information data may determine a statistical representative value for the performance information data through window sliding overlapped at a predetermined interval. The management server 100 may generate not a rule for the explicit event defined by the user but a rule for the potential event which may be automatically detected by the management server 100 based on the statistical representative value.

The event management manager 110 of the management server 100 may perform event management related functions such as determining whether the event occurs based on the performance information data collected from the agents 311, 321, and 331 or designating the event detection rule.

An explicit event detecting engine 111 may manage the event detection rule explicitly designated by the user. The explicit event detecting engine 111 may generate the detection rule for the explicit event, perform scheduling for the explicit event detection, and determine whether to generate the explicit event. The explicit event detecting engine 111 may determine to generate the explicit event when the event corresponding to the detection rule for the explicit event occurs. The performance information data collected from the agent may be stored in the performance information DB 220. In this case, the explicit event detecting engine 111 may bring the performance information data from the performance information DB 220 and determine whether to generate the event. The detected or generated event may be stored in, for example, an event DB 230.

A potential event detection engine 112 may detect and manage the potential event. The potential event detection engine 112 may perform preprocessing of the performance information data. The potential event detection engine 112 may perform scheduling for detection of the potential event. The potential event detection engine 112 may set and manage the rule for the potential event detection. The potential event detection engine 112 may bring the performance information data from the performance information DB 220 at a predetermined period. Then, the potential event detection engine 112 may detect the potential event by performing the preprocessing (e.g., window slicing) of the performance information data. The detected or generated potential event may be stored in the event DB 230.

The potential event detection engine 112 determines average information and standard deviation information for statistical representative values to generate normal distribution data and detect the potential event by determining whether the statistical representative value of a new data group is abnormal based on the normal distribution data.

The potential event detection engine 112 decides whether the statistical representative value of the new data group is abnormal by determining distance data of each of the statistical representative value of the new data group and the existing statistical representative value by using a k-nearest neighbor (kNN) algorithm to detect the potential event.

The potential event detection engine 112 determines whether the new data. group is abnormal by a method of deriving a predictable future value from the existing statistical representative values by using a recurrent neural network (RNN) and comparing the statistical representative value of the new data group with the predictable future value to detect the potential event.

The management server 100 may communicate with the DB server 200, the management target group 300, and/or the management monitoring group 400 through a predetermined network. For example, the management server 100 may transmit information on the determined potential event to the management monitoring group 400.

In the exemplary embodiment of the present disclosure, the management server 100 may analyze and detect the root cause for the incident event which occurs. The management server 100 may detect that the incident configuration item (CI) event which occurs in the management target group 300 occurs. The management server 100 may identify the incident CI related with the incident CI event and thereafter, decide the identified incident CI and candidate CIs having a predetermined hierarchy depth based on the CI relation information in the CMDB 240. Herein, the hierarchy depth may be associated with a distance between the CIs in the CI relation information. For example, the hierarchy depth may be associated with the number of connection lines which exist among the CIs in the CI relation information. The CIs in the CI relation information may form the nodes and a connection and a connection relation among the nodes may be expressed in the CI relation information.

The management server 100 may identify candidate events which occur in the candidate CIs and decide an occurrence time of each of the respective candidate events. The occurrence time of each of the candidate events and the occurrence time of the incident CI event are compared with each other to decide candidate events in which a comparison result is within a predetermined difference value as analysis target events. The management server 100 may decide one or more analysis target events among the candidate events based on the decided occurrence time. Event correlation information for connecting the analysis target events to each other may be generated by the management server 100.

The management server 100 may decide causality indicating a directional property for mutual connection of the analysis target events included in the event correlation information based on the CI relation information in the CMDB 240. The causality may be reflected to the event correlation information. For example, the reflected causality may represent a connection direction in the event correlation information connecting the events to each other. The management server 100 may decide connection strength for the connection between the events and search the root cause for the incident CI event based on the causality and the connection strength.

The management server 100 may decide an order of searching the root cause for the incident CI event based on the causality and the connection strength. Based on a user feedback for a search result, the management server 100 may reperform a process of searching the root cause by a method that controls the hierarchy depth or reperform the process of searching the root cause by reselling the CI or CI event which becomes a reference.

In the present disclosure, the incident management manager 120 of the management server 100 may include an incident diagnosis engine 121 and a root cause analysis engine 122 and a root cause analysis engine 122 may include an event correlation analysis unit 122A and a causality analysis unit 122B. The incident management manager 120 may decide whether the event (CI event) which occurs with respect to a specific host is the incident CI event. Whether the event which occurs with respect to the specific host is the incident CI event may be decided based on a severity level of the CI event, the number of other CIs influenced by the CI event, and/or a time required for recovering the CI event. The incident management manger 120 may generate the event correlation information for the incident CI event which occurs and decide the causality and the connection strength. The incident management manager 120 reflects the causality and the connection strength to the event correlation information to decide a path and a priority for searching the root cause. The incident management manager 120 may execute the root cause searching process.

The incident diagnosis engine 121 receives event information from the event DB 230 to decide whether the received event is associated with the incident. Information on the incident may be stored in an incident information DB 250.

The root cause analysis engine 122 analyzes the correlation of the event and decides the causality and the connection strength to decide the root cause for the incident CI event.

The event correlation analysis unit 122A may analyze the correlation between the events. The event correlation analysis unit 122A may receive the event information from the event DB 230, receive the incident information from the incident information DB 250, and receive the CI and CI relation information from the CMDB 240. The event correlation analysis unit 122A analyzes the correlation between the events by using the information received from the DBs to generate the event correlation information.

The causality analysis unit 122B may perform causality analysis by using at least one of the event correlation information and the CI relation information. The causality analysis unit 122B may decide the connection strength between the events. The causality analysis unit 122B may perform the root cause analysis for the incident CI event. The root cause (that is, a final analysis result) of the incident CI event decided by the causality analysis unit 122B may be transferred to the user (e.g., management monitoring group 400). When the causality analysis unit 122B receives final acknowledgement for the root cause from the management monitoring group 400, the causality analysis unit 122B may store a result for the root cause analysis in a fault solution DB 270. The result stored in the fault solution DB 270 may include information on the fault and the root cause of the fault and the information may be reused for the causality analysis in the future.

The DB server 200 may include a predetermined type of computer system or computer device such as a microprocessor, a mainframe computer, a digital processor, a portable device, and a device controller. The management server 100 may also include a separate database management system (DBMS) 130 and/or a persistent storage. In FIG. 2, one database server is exemplarily illustrated, but it will be apparent to those skilled in the art that database servers therethan may also be included in the scope of the present disclosure. Moreover, the DB server 200 may be installed inside the management server 100.

Although not illustrated in FIG. 2, the DB server 200 may include one or more memories including a buffer cache. Further, although not illustrated in FIG. 2, the DB server 200 may include one or more processors. Therefore, the DBMS in the DB server 200 may be operated by the processor on the memory.

Herein, the memory as a primary storage device directly accessed by the processor, such as a random access memory (RAM) including a dynamic random access memory (DRAM), a static random access memory (SRAM), etc., may mean a volatile storage device in which stored information is momentarily erased when power is turned off, but is not limited thereto. The memory may be operated by control by the processor. The memory may temporarily store a data table including a data value. The data table may include the data value and in the exemplary embodiment of the present disclosure, the data value of the data table may be written in the persistent storage from the memory, In an additional aspect, the memory may include the buffer cache and data may be stored in a data block of the buffer cache. The data may be written in the persistent storage by a background process.

The persistent storage means a non-volatile storage medium which may consistently store predetermined data, such as a magnetic disk, an optical disk, and a magneto-optical storage device and a storage device based on a flash memory and/or a battery-backup memory. The persistent storage may communicate with the processor and the memory of the DB server 200 through various communication means. In an additional exemplary embodiment, the persistent storage is positioned outside the DB server 200 to communicate with the DB server 200. Further, a type in which a plurality of DBMSs is connected to one persistent storage or a type including the plurality of persistent storages may also be included in the scope of the present disclosure.

The DBMS as a program for permitting the DB server 200 to perform operations including retrieval, insertion, modification, and/or deletion of required data may be implemented by the processor in the memory of the DB server 200 as described above.

The DB server 200 may include an event detection rule DB 210, the performance information DB 220, the event DB 230. the CMDB 240, the incident information DB 250, an analysis information DB 260, and the fault solution DB 270. A predetermined combination of the DBs in the DB server 200 may be implemented in such a manner that the predetermined combination communicates with other server while being included in a separate server. Further, the DBs in the DB server 200 may be persistent storages managed by the DBMS. The DB server 200 may communicate with the management server 100, the management target group 300, and/or the management monitoring group 400 through a predetermined network.

The event detection rule DB 210 may store a detection rule for the explicit event and/or potential event. The performance information DB 220 may store the performance information data collected by the agents 311, 321, and 331. The event DB 230 may store events which occur by an explicit event and/or potential event detection engine.

The CMDB 240 may mean a configuration management database which store the CIs and the CI relation information of the hosts 310, 320, and 330 which belong to the management target group 300.

The CMDB 240 may capture the relation between the configuration items (CIs). For example, the application is executed by an application server. In individual CI relations, one CI may be a source of the corresponding relation and the other CI may be an object. In the example, an application CI may become the source and a server may become the object.

The incident information DB 250 may store incident information defined by the incident diagnosis engine 121.

The analysis information DB 260 may store a result analyzed by the root cause analysis engine 122.

The fault solution DB 270 may store the fault information (e.g., incident CI event information) and a final result for the root cause analysis or a result verified by the user, which corresponds to the fault information.

The management monitoring group 400 may include integrated management monitors 410 420, and 430. The integrated management monitors 410, 420, and 430 may mean the node(s) in the management system 1000 having a mechanism for communication through the network. For example, the integrated management monitors 410, 420, and 430 may include a PC, a laptop computer, a workstation, a user terminal, and/or a predetermined electronic device having network connectivity. Further, the integrated management monitors 410, 420, and 430 may include a predetermined server implemented by at least one of agent, application programming interface (API), and plug-in. In addition, the integrated management monitors 410, 420, and 430 may include an application source and/or a client application.

The integrated management monitors 410, 420, and 430 may be a predetermined entity which includes the processor and the memory to process and store predetermined data. Further, the integrated management monitors 410, 420, and 430 in FIG. 2 may be related with a user which uses the manager server 100 and/or the DB server 200 or communicates with the manager server 100 and the DB server 200. In such an example, the integrated management monitors 410, 420, and 430 may issue a query to the manager server 100 or the DB server 200. In one example, the integrated management monitors 410, 420, and 430 may receive the incident CI event, the potential event detection result, and/or the root cause analysis result from the manager server 100 or the DB server 200. Further, the integrated management monitors 410, 420, and 430 compile the application source to generate the client application.

The integrated management monitors 410, 420, and 430 may inquire/receive a query result for the DB server 200 and include predetermined user interfaces including an event management UI, an agent management UI, an incident management UI, and the like. The integrated management monitors 410, 420, and 430 or the management monitoring group 400 in the present specification may be used to be replaced with the user.

Components in the management monitoring group 400 may communicate with the management server 100, the DB server 200, and/or the management target group 300 through a predetermined network.

The management target group 300 may mean an aggregate of the hosts monitored by the management server 100. An agent tool may be installed in each of the hosts 310, 320, and 330.

The agents 311, 321, and 331 may collect the performance information data for the host and transfer the collected performance information data to the management monitoring group 400, the management server 100, and/or the DB server 200. For example, the agents 311, 321, and 331 may transfer the collected performance information data to the DB server 200 and the corresponding performance information data may be stored in the performance information DB 220 in the DB server 200.

As described above, the components in the management system 1000 may communicate with each other through a network (not illustrated). The network according to the exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network presented in the present specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems. Additionally, the network may include a database link (dblink), and as a result, the components communicate with each other through the database link to fetch data from another server. The techniques described in the present specification may be used in other networks in addition to the aforementioned networks.

Figure 3:
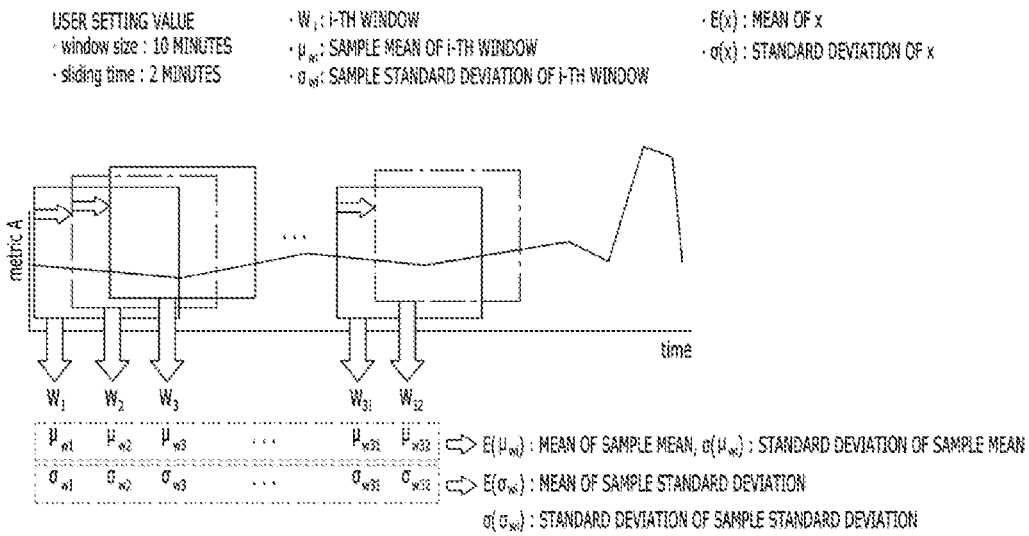
FIG. 3 illustrates an exemplary technique of detecting a potential event according to an exemplary embodiment of the present disclosure.

FIG. 3 illustrates an exemplary technique of detecting a potential event according to the exemplary embodiment of the present disclosure. The technique performed in FIG. 3 may be performed by the management server 100 (e.g., the potential event detection engine 112 of the event management manager 110).

The management server 100 may receive performance information data acquired by measuring values of performance indicators of the hosts 310, 320, and 330 to be monitored during a predetermined period. The management server 100 may create windows $W_1$, $W_2$, $W_3$ . . . having predetermined sizes for application to the performance information data. The created windows $W_1$, $W_2$, $W_3$ . . . may have sizes and sliding intervals according to a predetermined set value (e.g., window size: 10 minutes and sliding time: 2 minutes). At least some of the respective windows $W_1$, $W_2$, $W_3$ . . . may overlap with each other. The windows $W_1$, $W_2$, $W_3$ . . . may have the same size and the same sliding interval according to the predetermined set value.

A horizontal axis of each of the windows may represent time information and a vertical axis of each of the windows may represent value information of the performance indicator.

As illustrated in FIG. 3, the statistical representative value (e.g., a sample mean $\mu_{wi}$ of each window and/or a sample standard deviation $\sigma_{wi}$ of each window) of the performance information data may be decided, which is included in each of the windows $W_1$, $W_2$, $W_3$ . . . . Herein, i may correspond to a predetermined natural number.

The statistical representative values for the respective decided statistical representative values ($\mu_{wi}$ and/or $\sigma_{wi}$) may be decided. That is, a mean (that is, $E(\mu_{wi})$) of the sample mean/a standard deviation (that is, $\sigma(\mu_{wi})$) of the sample mean and/or a mean (that is, $E(\sigma_{wi})$) of a sample standard deviation) of the sample standard deviation/a standard deviation (that is, $\sigma(\sigma_{wi})$) of the sample standard deviation may be decided. That is, the statistical representative values for the statistical representative values may be decided.

The potential event associated with an abnormal situation in the management system 1000 may be decided at least partially based on the statistical representative values.

Figure 4:
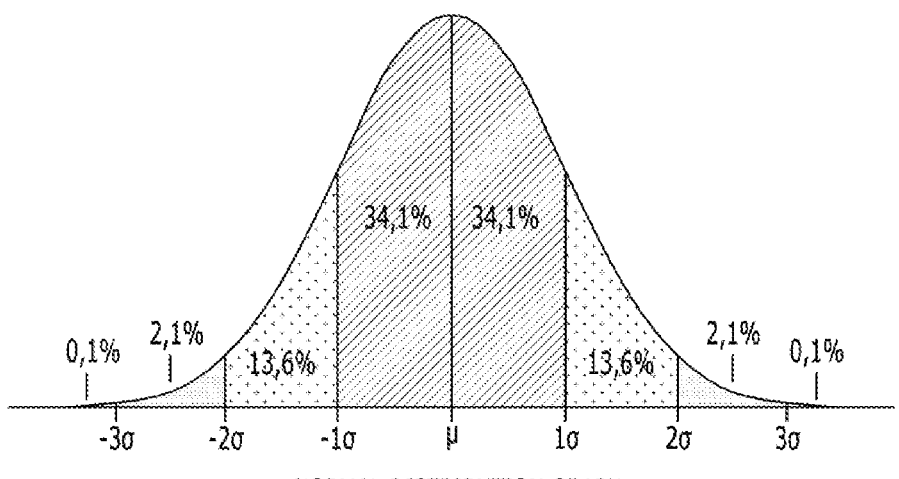
FIG. 4 illustrates an exemplary technique of detecting a potential event according to an exemplary embodiment of the present disclosure.

FIG. 4 illustrates an exemplary technique of detecting a potential event according to an exemplary embodiment of the present disclosure. The technique performed in FIG. 4 may be performed by the management server 100 (e.g., the potential event detection engine 112 of the event management manager 110).

FIG. 4 illustrates normal distribution data (e.g., normal distribution graph) generated by using the sample mean or the mean for the sample standard deviation and the standard deviation for the sample mean or the standard deviation for the sample standard deviation.

As illustrated in FIG. 4, the mean for the sample mean or the mean for the sample standard deviation may be expressed as $\mu$ and the standard deviation for the sample mean or the standard deviation for the sample standard deviation may be expressed as $\sigma$.

According to the exemplary embodiment of the present disclosure, when a reference range of a predetermined abnormality is set to $3\sigma$, if a value of the sample mean for a new window >$\mu \pm 3\sigma$, the potential event for new measured data may be decided to occur. Additionally, when the reference range of the predetermined abnormality is set to $3\sigma$, if the value of the sample standard deviation for the new window >$\mu \pm 3\sigma$, the potential event for the new measured data may be decided to occur. That is, whether the potential event for the new data measured through the new window may be decided through a value of the sample mean and/or a value of the sample standard deviation for the new window and values shown in the normal distribution data.

Further, when the reference range of the predetermined abnormality is set to $2.5\sigma$, if the value of the sample mean for the new window >$\mu \pm 2.5\sigma$, the potential event for the new measured data may be decided to occur. Additionally, when the reference range of the predetermined abnormality is set to $2.5\sigma$, if the value of the sample standard deviation for the new window >$\mu \pm 2.5\sigma$, the potential event for the new measured data may be decided to occur. That is, whether the potential event for the new data measured through the new window may be decided through the value of the sample mean and/or the value of the sample standard deviation for the new window and the values shown in the normal distribution data.

Figure 5:
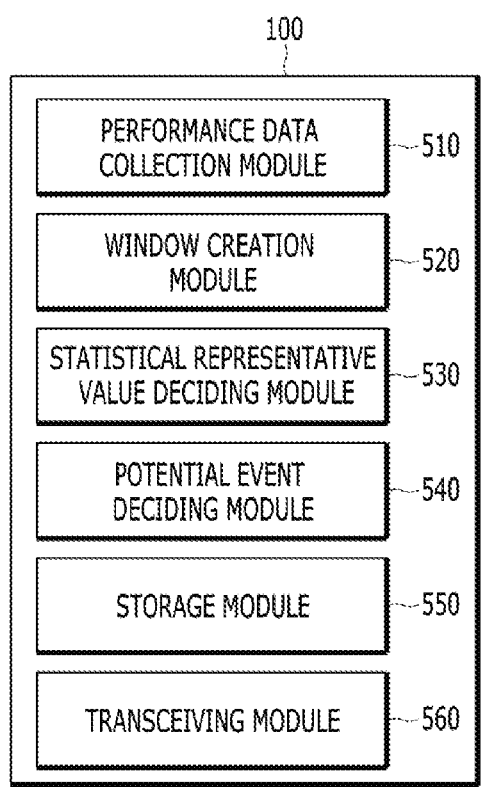
FIG. 5 is an exemplary block diagram of a management server that detects a potential event according to an exemplary embodiment of the present disclosure.

FIG. 5 is an exemplary block diagram of a management server 100 that detects a potential event according to an exemplary embodiment of the present disclosure. The components illustrated in FIG. 5 are separated by a functional unit for detecting the potential event to be exemplarily expressed. Accordingly, names of the components in FIG. 5 may be different from those of the components illustrated in FIG. 2, but all functions performed by the management server 100 in FIGS. 2 and 5 are the same as each other. For example, the components illustrated in FIG. 5 may be included in the potential event detection engine 112.

As illustrated in FIG. 5, the management server 100 may include a performance data collection module 510, a window creation module 520, a statistical representative value deciding module 530, a potential event deciding module 540, a storage module 550, and a transceiving module 560.

The components illustrated in FIG. 5 are exemplary and additional components may exist or some of the components may be omitted.

The performance data collection module 510 may be configured to collect the performance information data acquired by measuring the values of the performance indicators of the hosts 310, 320, and 330 to be monitored during the predetermined period from the DB server 200.

The window creation module 520 may be configured to create a first window having a predetermined size for application to the performance information data and create a second window for application to the performance information data. Herein, the second window may have the same size as the first window and may be spaced apart from the first window by a predetermined interval. The window creation module 520 may perform the window slicing based on setting information pre-input from the user.

The statistical representative value deciding module 530 may be configured to decide a first statistical representative value from the performance information data included in the first window and a second statistical representative value from the performance information data included in the second window.

The potential event deciding module 540 may be configured to decide the potential event related with the abnormal situation in the IT system at least partially based on the first statistical representative value and the second statistical representative value. Although not illustrated in FIG. 5, the potential event deciding module 540 may include a first potential event deciding sub module which decides mean information and standard deviation information for the first statistical representative value and the second statistical representative value to generate the normal distribution data and decides a first abnormality for the statistical representative value of a new data group based on the normal distribution data; a second potential event deciding sub module which decides a second abnormality for the statistical representative value of the new data group by determining distance data of the statistical representative value of the new data group, and the first statistical representative value and the second statistical representative value by using the k-nearest neighbor (kNN) algorithm; and a third potential event deciding sub module which decides a third abnormality for the new data group by deriving the predictable future value from the first statistical representative value and the second statistical representative value by using the recurrent neural network (RNN) and comparing the statistical representative value of the new data group with the predictable future value.

The storage module 550 may be configured to store the decided potential event in the DB server 200. The storage module 550 may persistently or temporarily store data required for detecting the potential event in the persistent storage or the memory. The storage module 550 may decide a storage location of data to be stored in the data table. As another example, the storage module 550 may determine the storage location of the data in the persistent storage. The storage module 550 may temporarily or permanently store or determine to store predetermined data processed and stored by the management server 100.

The transceiving module 560 may provide a communication function with the DB server 200, the management target group 300, the management monitoring group 400, and/or other server(s). For example, the transceiving module 560 may transmit a result indicating whether the potential event occurs to the integrated monitors 410, 420, and 430 through a predetermined network. For example, the transceiving module 560 may receive the performance information data from the DB server 200 or the management target group 300. Further, the transceiving module 560 may be configured to receive setting information required for deciding the potential event from the user (e.g., management monitoring group 400). Herein, the setting information may include size information of the window, the predetermined interval information, first abnormality reference value information for comparing the normal distribution data and the new data, second abnormality reference value information representing the threshold of the distance data, and third abnormality reference value information representing the threshold of a difference between the predictable future value and the statistical representative value of the new data group.

Although not illustrated in FIG. 5, as described below in FIG. 7, the management server 100 may further include a root cause analysis module which decides the root cause information for the abnormal situation by performing the correlation analysis between the events at least partially based on the CI information and the CI relation information stored in the CMDB 240 and performing the causality analysis for the abnormal situation of the management system 1000 based on the result of the correlation analysis.

Figure 6:
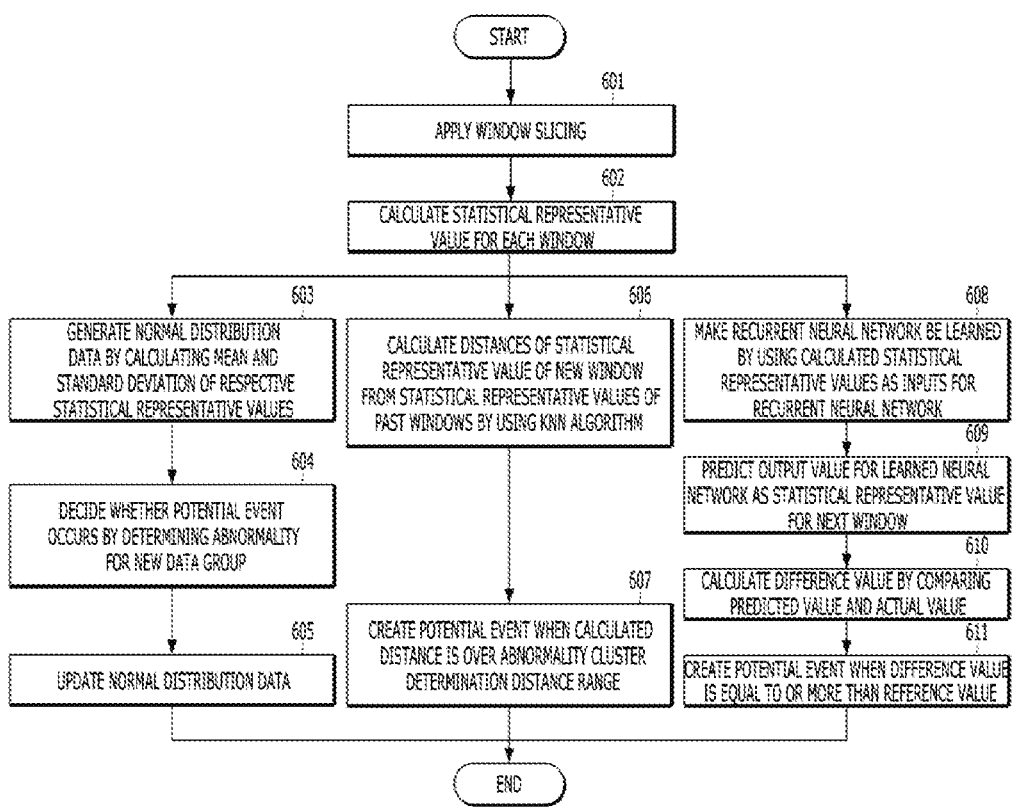
FIG. 6 is a flowchart illustrating an exemplary technique of detecting a potential event according to an exemplary embodiment of the present disclosure.

FIG. 6 is a flowchart illustrating an exemplary technique of detecting a potential event according to an exemplary embodiment of the present disclosure. Steps illustrated in FIG. 6 are exemplary and some of the steps may be omitted or an additional step may also be included. The steps performed in FIG. 6 may be performed by the management server 100, the event management manager 110, or the potential event detection engine 112.

As illustrated in FIG. 6, the window slicing for the collected performance information data may be applied (601). The statistical representative values for the respective windows may be calculated (602). For example, the performance information data acquired by measuring the values of the performance indicators of the hosts 310, 320, and 330 to be monitored during the predetermined period may be collected in the management system 1000. Then, the first window having the predetermined size to be applied to the performance information data may be created and the second window having the predetermined size to be applied to the performance information data may be created. Additionally, a third window, a fourth window, . . . , an n-th window may be created. Herein, the respective windows may have the same size and slide in such a manner that the each window is spaced apart from an adjacent window by a predetermined interval. The size and the predetermined interval of the window may be decided based on an input value pre-received from the user.

Then, the first statistical representative value of the performance information data included in the first window may be decided and the second statistical representative value of the performance information data included in the second window may be decided. The first statistical representative value may include at least one of the mean value and the standard deviation value of the first window and the second statistical representative value may include at least one of the mean value and the standard deviation value of the second window.

When the process proceeds to step 603, the means and the standard deviations for the respective statistical representative values are calculated to generate the normal distribution data. Then, the abnormality for the new data group is determined by calculating the mean and the standard deviation of the window for the new data group to thereby decide whether the potential event occurs (604). At least one of the sample mean value and the sample standard deviation value for the new data group is decided by applying a new window for the new data group to decide the statistical representative value of the new data group. Herein, the new window may have the same size as the first and second windows and may be spaced apart from the second window by the predetermined interval. When the statistical representative value of the new data group deviates from the predetermined abnormality range reference received from the user in the normal distribution data, it may be decided that the new data group corresponds to the potential event. A location of the statistical representative value of a past data group and the location of the statistical representative value of the new data group in the normal distribution data for the statistical representative value of the past data group are compared with each other to decide whether the potential event for the new data group occurs.

When it is decided that the potential event occurs, the potential event is transferred to the integrated management monitors 410, 420, and 430, and as a result, the user may recognize whether the potential event occurs.

When the potential event occurs, the normal distribution data may be updated (605). The statistical representative value of the new data group is added to the normal distribution data to update the normal distribution data.

When the process proceeds to step 606, distances of the statistical representative value of the new window from the statistical representative values of respective past windows may be calculated by using the kNN algorithm. Alternatively, the distances of the statistical representative value of the new window from the statistical representative values of the past windows may be calculated by using the kNN algorithm. Then, when the calculated distances are more than an abnormal cluster determination distance range (pre-input from the user), it may be decided that the potential event occurs (607). That is, the statistical representative value of the new data group is compared with each of the first statistical representative value and the second statistical representative value by using the k-nearest neighbor (kNN) algorithm to acquire distance data and then, when the distance data is more than a reference distance (pre-input from the user), it may be decided that the new data group corresponds to the potential event.

In an additional aspect of the present disclosure, the management server 100 may perform an operation of acquiring the distance data by comparing the statistical representative value of the new data group with at least one of the mean value of the representative values and the standard deviation value of the representative values by using the k-nearest neighbor (kNN) algorithm, and an operation of deciding that the new data group corresponds to the potential event when the distance data is more than the reference distance.

When the process proceeds to step 608, the management server 100 uses the statistical representative values as inputs for the recurrent neural network to allow the recurrent neural network to be learned. In this case, the management server 100 may use a neural network for implementing an artificial intelligence technology. The neural network is constituted by two or more nodes and links linking the nodes. Weights may be set in the respective links and the weights granted to the links may be variable. The weights granted to the links may be modified to be suitable for performing the learning intended by the neural network.

In this case, the management server 100 may include the processor, a GPU, and the memory. The processor may be constituted by one or more processors and may include a central processing unit (CPU). The processor may perform a training method of an artificial neural network (ANN) or the recurrent neural network according to the exemplary embodiment of the present disclosure and a data classifying method using the trained neural network by reading a computer program stored in the memory. According to the exemplary embodiment of the present disclosure, the processor or GPU may perform a calculation for training the neural network. In the exemplary embodiment of the present disclosure, the processor may include both the CPU and the GPU and additionally include predetermined processing devices for processing the neural network. The neural network learning method according to the exemplary embodiment of the present disclosure may be performed by the processor. The graphics processing unit (GPU) may perform calculations for learning the neural network, which include processing of input data for learning in deep learning (DN), extracting a feature in the input data, calculating an error, updating a weight of the neural network using backpropagation, and the like. Further, a computer program executed by the management server 100 according to the exemplary embodiment of the present disclosure may be a GPU-executable program. In addition, according to the exemplary embodiment of the present disclosure, the management server 100 may include a tensor processing unit (TPU). The memory may store computer programs for performing the training method of the artificial neural network and the data classifying method according to the exemplary embodiment of the present disclosure and the stored computer programs may be read and driven by the processor and the GPU.

Throughout the present specification, the recurrent neural network, the neural network, a network function, and the neural network may be used as the same meaning. The neural network may be generally constituted by an aggregate of calculation units which are mutually connected to each other, which may be called "node". The "nodes" may also be called "neurons". The neural network is configured to include two or more nodes. The nodes (alternatively, neurons) constituting the neural networks may be mutually connected to each other by one or more "links".

In the neural network, two or more nodes connected through the link may relatively form the relation between an input node and an output node. Concepts of the input node and the output node are relative and a predetermined node which is in the output node relation with respect to one node may have the input node relation in the relation with another node and vice versa. As described above, the relation of the output node to the input node may be generated based on the link. One or more output nodes may be connected to one input node through the link and vice versa.

In the relation of the input node and the output node connected through one link, a value of the output node may be determined based on data input in the input node. Herein, a node connecting the input node and the output node to each other may have a weight. The weight is variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, two or more nodes are connected to each other through one or more links to form the input node and output node relations in the neural network. A characteristic of the neural network may be determined according to the number of nodes in the network, the number of nodes and the number of links in the neural network, correlations between the nodes and the links, and values of the weights granted to the respective links. For example, when the same number of nodes and links exist and two neural networks in which the weight values of the links are different from each other exist, it may be recognized that two neural networks are different from each other.

When the process returns to step 609, the management server 100 may predict an output value for the learned neural network as the statistical representative value for a next window. Then, the management server 100 may calculate a difference value by comparing a predicted value and a new actual data value with each other (610) and decide to generate the potential event when the difference value is more than or equal to or more than a reference value set from the user (611).

The management server 100 decides the statistical representative value of the new data group by deciding at least one of the sample mean value for the new data group and the sample standard deviation value for the new data group by applying the new window for the new data group, derives the predictable future value from the first statistical representative value and the second statistical representative value by using the recurrent neural network (RNN), and compares the statistical representative value of the new data group with the predictable future value to decide whether the new data group corresponds to the potential event.

In an additional exemplary embodiment, the management server 100 derives the predictable future value from at least one of the mean value of the representative values and the standard deviation value of the representative values by using the recurrent neural network (RNN) and compares the statistical representative value of the new data group with the predictable future value to decide whether the new data group corresponds to the potential event.

In implementing the methods illustrated in FIG. 6, the management server 100 may store an abnormality reference value in comparison with a window size, a sliding time, and the normal distribution data, an abnormal cluster determination distance value in a case using a clustering algorithm, and an abnormality determination distance value in a case using the neural network learning algorithm as a predetermined value or a user set value.

Figure 7:
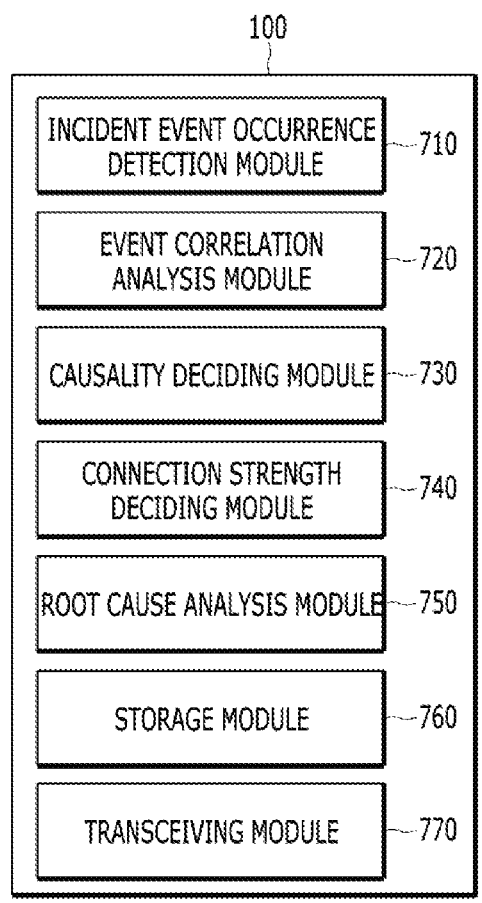
FIG. 7 is an exemplary block diagram of a management server that performs root cause analysis according to an exemplary embodiment of the present disclosure.

FIG. 7 is an exemplary block diagram of a management server 100 that performs root cause analysis according to an exemplary embodiment of the present disclosure. As illustrated in FIG. 7, the management server 100 may include an incident event occurrence detection module 710, an event correlation analysis module 720, a causality deciding module 730, a connection strength deciding module 740, a root cause analysis module 750, a storage module 760, and/or a transceiving module 770. The modules illustrated in FIG. 7 are exemplary and some of the modules may be omitted or additional modules may be included in the management server 100.

The components illustrated in FIG. 7 are separated by the functional unit for analyzing the root cause to be exemplarily expressed. Accordingly, names of the components in FIG. 7 may be different from those of the components illustrated in FIG. 2, but all functions performed by the management server 100 in FIGS. 2 and 7 are the same as each other. For example, the components illustrated in FIG. 7 may be included in the incident management manager 120.

The incident event occurrence detection module 710 may be configured to detect whether the incident CI event for at least one of the hosts (that is, nodes 310, 320, and 330) to be monitored occurs in the management system 1000. Herein, the respective hosts may match the CIs in the configuration management database 240, respectively and the CMDB 240 may include the CIs and the CI relation information. The incident information DB 250 may store the incident information defined by the incident diagnosing engine 121. The incident event occurrence detection module 710 may receive from the incident information DB 250 information to determine whether a specific event is the incident CI event. The incident event occurrence detection module 710 may directly decide whether the corresponding event is the incident CI event based on the event received from the event DB 230. Herein, an "incident CI event" may mean an event which is shown when the fault for the corresponding CI occurs.

The event correlation analysis module 720 may identify the incident CI related with the incident CI event based on the CI relation information in the CMDB 240 and decide candidate CIs having the identified incident CI and a predetermined hierarchy depth. The event correlation analysis module 720 may identify candidate events which occur in the candidate CIs and decide an occurrence time of each of the candidate events. The event correlation analysis module 720 compares the occurrence time of each of the candidate events and the occurrence time of the incident CI event with each other to decide candidate events in which a comparison result is within a predetermined difference value (e.g., a correlation time value designated by the user) as analysis target events, The analysis depth and the correlation time value are predetermined to be stored in the management server 100 or the DB server 200. The event correlation analysis module 720 may generate event correlation information for connecting the analysis target events to each other. The CI relation information managed by the CMDB 240 represents a hierarchical relation of the CIs, while the event correlation information generated by the event correlation analysis module 720 may represent a connection relation between the incident CI and the CIs having the correlation with the incident CI. That is, the event correlation information may represent CIs CI events having a mutual correlation with the incident CI.

The causality relation deciding module 730 may decide causality indicating a directional property for mutual connection of the analysis target events based on at least one of the CI relation information and the event correlation information in the CMDB 240. The causality may identify a cause event and a result event for each connection in the event correlation information. That is, the correlation in the event correlation information may represent that there is the correction between the events and the event correlation information to which the causality is reflected may represent the cause and the result for the correlation.

The causality deciding module 730 analyzes the CI relation information in the CMDB 240 to derive an immanent causality which immanently exists in the relation between the CIs related with the analysis target events. For example, a physical host CI on a cloud infrastructure and a virtual host CI created on the corresponding physical host may have the correlation. In the correlation, there is a hierarchical property exists between both CIs and the physical host may influence the virtual host, but not vice versa. Such a relation may mean an immanent causality in the CI relation. Such an immanent causality may be predetermined when the user sets the CI relation in the CMDB 240 or set by default in the management server 100.

The causality deciding module 730 decides the occurrence time for each of the analysis target events to decide a temporal order relation for occurrence of the analysis target events. For example, when a first CI event occurs earlier in time than a second CI event, the first CI event may be decided to become the cause event of the second CI event. That is, there is a high possibility that the analysis target event which occurs earlier in time will become the cause event and there is a high possibility that the analysis target event which occurs later in time will become the result event.

The causality deciding module 730 may decide the causality between the analysis target events in the event correlation information based on the immanent causality and the temporal order relation. In the exemplary embodiment, the causality deciding module 730 may decide the causality in a manner that gives a higher weight to the immanent causality than the temporal order relation. In the exemplary embodiment, it may be construed that the immanent causality has a clearer causal property than the temporal order relation.

The connection strength deciding module 740 may decide the connection strength representing a strength of influence which the cause event among the analysis target events having the causality exerts on the result event. For example, the connection strength may be expressed numerically. In such an example, it may be meant that the larger a numerical value of the connection strength, the greater the strength of influence which the cause event exerts on the result event.

The connection strength deciding module 740 may determine whether there is a status change for the CIs related with the analysis target events and acquire change history information including a change time indicating a time when the change occurs when there is the status change. The connection strength deciding module 740 compares the change history information and the occurrence time of the incident CI event to decide the change strength. When there is the status change e.g., CI update, etc.,) of the CI on the CMDB 240 at a time approximate to the occurrence time of the incident CI event, there may be a high possibility that the CI of which the status change is made will cause an issue. For example, it is assumed that an update history for the first CI is discovered before a predetermined time based on the occurrence time of the incident CI event. In such an example, it may be determined that there is a high possibility that the update of the first CI will cause the incident CI event. Numerically expressing the possibility may be defined as the change strength. Therefore, the connection strength deciding module 740 may decide the connection strength based on the change strength. As the change strength increases, the connection strength may also increase.

The connection strength deciding module 740 may decide the connection strength based on at least one of explicitness, event severity, time proximity, depth proximity, and the number of cause history times. According to the exemplary embodiment of the present disclosure, five factors may be presented as a reference which may influence the causal property. The "explicitness" is a reference indicating that the explicit event has a higher causality than the potential event. The "event severity" is a reference indicating that the higher the severity of the event, the higher the causality. The "time proximity" is a reference indicating that the causality is high when the difference in occurrence time between the events is small. The "depth proximity" is a reference indicating that the depth on the CI relation information of the CMDB 240 is proximate, the causality is high. "The number of cause history times" is a reference indicating that as the number of histories which is settled as the cause of an accident in the related art is large, the causality is high.

The connection strength deciding module 740 may decide the connection strength for the connections on the event correlation information based on the change strength and at least one of the factors. The decided connections strength is reflected to the event correlation information, and as a result, the respective connections of the event correlation information may have numerical values.

The root cause analysis module 750 may search the root cause for the incident CI event based on the event correlation information to which the causality and the connection strength are reflected. The root cause analysis module 750 selects a path in which the connection strength is large to search the root cause stepwise. Detailed techniques of searching and analyzing the root cause will be described below in association with FIG. 13.

The storage module 760 may be configured to store the incident CI event, the event correlation information, the causality, the connection strength, user setting values, and/or the root cause in the management server 100 and/or the DB server 200. The storage module 760 may persistently or temporarily store data required for detecting and analyzing the root cause in the persistent storage or the memory. The storage module 760 may decide a storage location of data to be stored in the data table. As another example, the storage module 760 may determine the storage location of the data in the persistent storage. The storage module 760 may temporarily or permanently store or determine to store predetermined data processed and stored by the management server 100.

The transceiving module 770 may provide a communication function with the DB server 200, the management target group 300, the management monitoring group 400, and/or other server(s). For example, the transceiving module 770 may transmit a result regarding the search and analysis of the root cause to the integrated monitors 410, 420, and 430 through a predetermined network. For example, the transceiving module 770 may receive the performance information data from the DB server 200 or the management target group 300. Further, the transceiving module 770 may be configured to receive setting information required for analyzing and detecting the root cause from the user e.g., management monitoring group 400).

Figure 8:
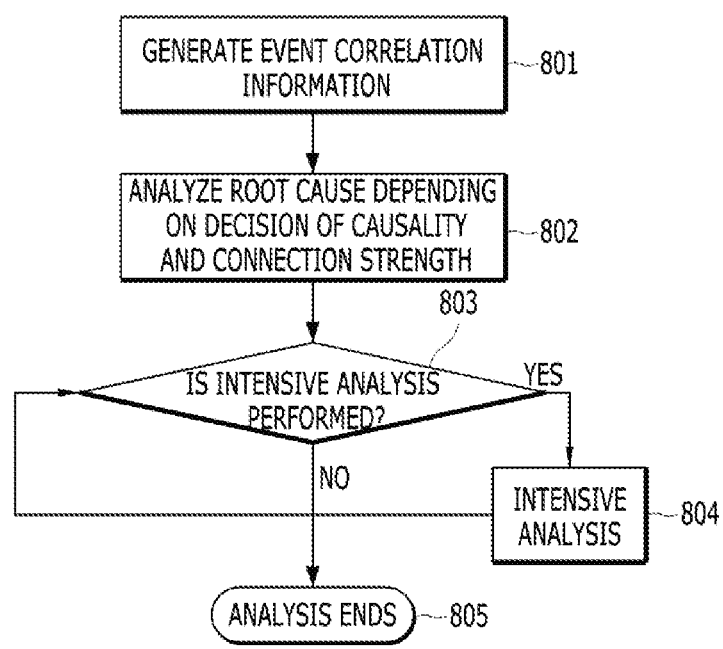
FIG. 8 is a flowchart of an exemplary method that performs root cause analysis according to an exemplary embodiment of the present disclosure.

FIG. 8 is a flowchart of an exemplary method that performs root cause analysis according to an exemplary embodiment of the present disclosure. Steps illustrated in FIG. 8 are just exemplary and additional steps may be included or some of the steps may be omitted.

The steps illustrated in FIG. 8 may be performed by, for example, the management server 100, the incident management manager 120, the incident diagnosis engine 121, and/or the root cause analysis engine 122.

In step 801, the management server 100 may generate the event correlation information. In this step, on the CI relation information, the CI event (that is, analysis target event) having the correlation with the incident CI event may be identified. The event correlation information may be decided based on two setting information (hierarchy depth and correlation time) received from the user. The hierarchy depth may be used for identifying the events of all CIs which exist within a predetermined hierarchy depth based on the incident CI on the CI relation information on the CMDB 240. The correlation time may mean a time limit value of the analysis, which is set by the user. That is, the correlation time may be used for regarding the events of the proximate CI which occurs before or within a specific time based on the time when the incident CI event occurs as the events having the correlation.

In step 802, the root cause analysis depending on the decision of the causality and the connection strength may be performed. The root cause analysis may be performed by reflecting the causality and the connection strength into the event correlation information. The management server 100 may search the root cause for the incident CI event based on the event correlation information to which the causality and the connection strength are reflected. The management server 100 selects the path in which the connection strength is large to search the root cause stepwise. A root cause searching result may be transferred to the user. The root cause searching result transferred to the user may include information on the CI event or a CI path and information on a root cause possibility for each path, The user may predict that the possibility for the root cause will be high in the order of a path having a higher priority by regarding the root cause searching result.

In step 803, whether to perform an intensive analysis after the root cause analysis may be decided. The intensive analysis may mean an analysis which is additionally performed according to a selective input from the management monitoring group 400 that receives a root cause analysis result.

When the intensive analysis is performed, the process proceeds to step 804 and according to the exemplary embodiments of the present disclosure, the intensive analysis may include (1) a technique of re-executing a root cause analysis process by readjusting the hierarchy depth and (2) a technique of re-executing the root cause analysis process based on selected ones among the analysis target events, the candidate events, or the candidate CIs.

When an input indicating that the intensive analysis need not be performed is received, a root cause analysis procedure may end (805).

Figure 9:
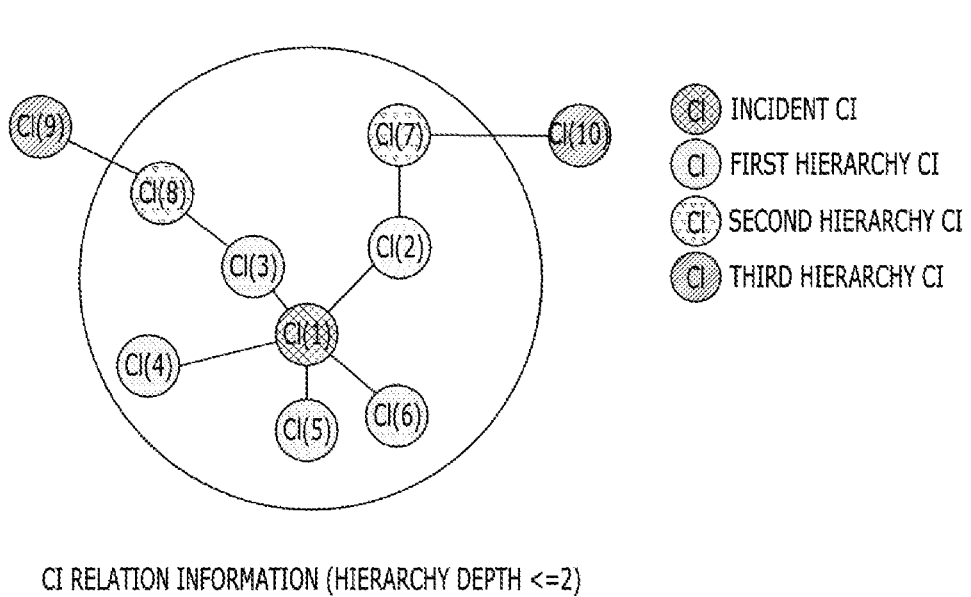
FIG. 9 illustrates exemplary CI relation information generated according to an exemplary embodiment of the present disclosure.

FIG. 9 illustrates exemplary CI relation information generated according to an exemplary embodiment of the present disclosure.

The CI relation information illustrated in FIG. 9 may be stored in the CMDB 240. The management server 100 may express the CI relation information by diagramming values of a table stored in the CMDB 240 as illustrated in FIG. 9.

In FIG. 9, CI 1 may mean the incident CI. CI 2, CI 3, CI 4, CI 5, and CI 6 may mean CIs having a hierarchy depth of 1 from CI 1 which is the incident CI. CI 7 and CI 8 may mean CIs having a hierarchy depth of 2 from CI 1 which is the incident CI. CI 9 and CI 10 may mean CIs having a hierarchy depth of 3 from CI 1 which is the incident CI.

In the example illustrated in FIG. 9, it is assumed that the value for the hierarchy depth received from the user is 2. In this case, as illustrated in FIG. 9, the CIs (that is, CI 2, CI 3, CI 4, CI 5, CI 6, CI 7, and CI 8) having the hierarchy depths of 1 and 2 may be included when the event correlation information is generated and the CIs (that is, CI 9 and CI 10) having the hierarchy depth of 3 may be excluded when the event correlation information is generated.

That is, the hierarchy depth of 2 received from the user means that events related with CIs connected within a hierarchy lower than the incident CI by two stages are identified as events to be used for the event correlation analysis. Therefore, the CIs are filtered by using the hierarchy depth to decide CIs adjacent (that is, close) to the incident CI as the candidate CIs.

Figure 10:
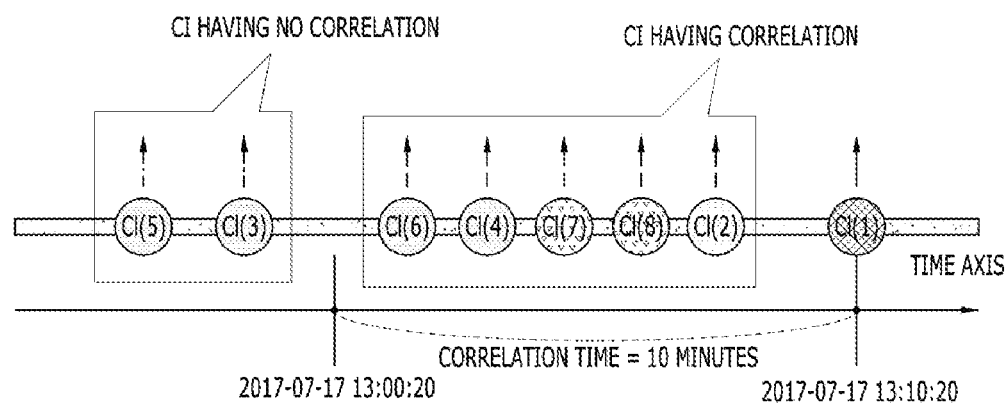
FIG. 10 illustrates an exemplary technique of identifying an event correlation according to an exemplary embodiment of the present disclosure.

FIG. 10 illustrates an exemplary technique of identifying an event correlation according to an exemplary embodiment of the present disclosure.

In the example of FIG. 10, it is assumed that the correlation time received from the user is 10 minutes. Therefore, CI events or CIs (e.g., CI 2, CI 8, CI 7, CI 4, and CI 6) within 10 minutes from 13:10:20 on Jul. 17, 2017 which is the occurrence time of the incident CI event may be regarded as the CIs or CI events having the correlation. CI events or CIs (e.g., CI 3 and CI 5) over 10 minutes from the occurrence time of the incident CI event may be regarded as CIs or CI events having no correlation.

That is, the correlation time value may mean the time limit value of the analysis, which is set by the user. Therefore, the CIs or CI events are filtered according to setting of the correlation time to decide events of a CI which occurs at a time adjacent to the occurrence time of the incident CI event as the analysis target events.

Figure 11:
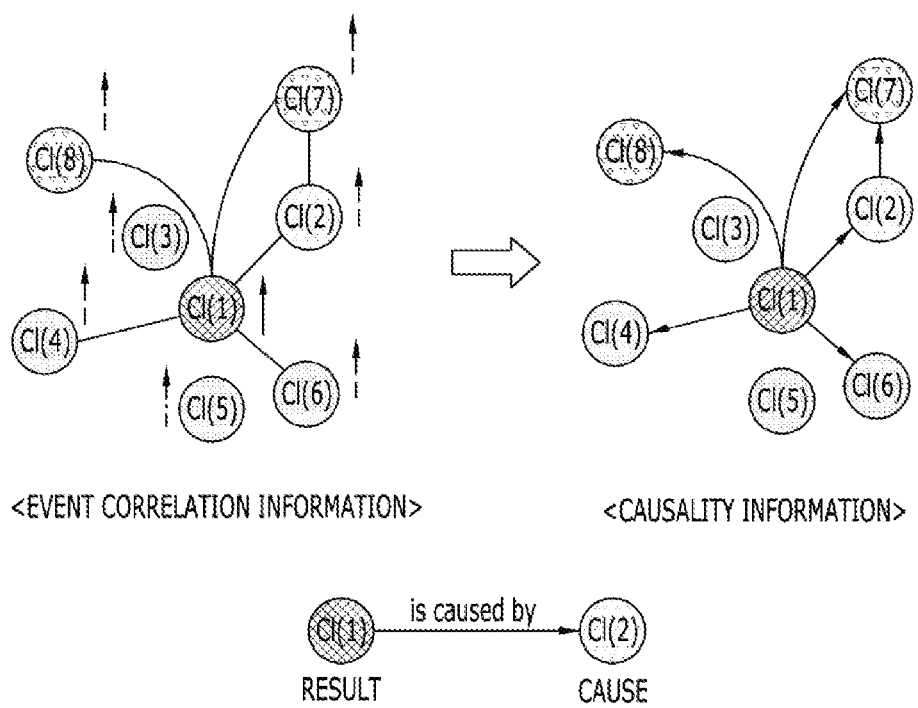
FIG. 11 exemplarily illustrates event correlation information and causality information generated according to an exemplary embodiment of the present disclosure.

FIG. 11 exemplarily illustrates event correlation information and causality information generated according to an exemplary embodiment of the present disclosure.

FIG. 11 illustrates the event correlation information generated. after the correlation analysis process in FIGS. 9 and 10 ends. In FIGS. 9 and 10, the CIs and the CI events may be filtered based on the hierarchy depth and the correlation time and when the correlation analysis ends, the event correlation information may include the analysis target events.

As illustrated in FIG. 11, CI 3 and CI 5 are the candidate CIs or candidate events, but are filtered through the correlation time not to be included in the analysis target events. That is, CI 3 and CI 5 may be decided as the CI events having no correlation with CI 1 which is the incident CI event.

A right diagram in FIG. 11 illustrates the event correlation information to which the causality is reflected. The connections among the analysis target events are illustrated in an arrow shape to express the causality. CI 1 is the result event for CI 2, CI 4, CI 6, CI 7, and CI 8 and CI 2, CI 4, CI 6, CI 7, and CI 8 are the cause event for CI 1. Further, CI 7 is the cause event for CI 2 and CI 2 is the result event for CI 7.

According to the exemplary embodiment of the present disclosure, as described above, the immanent causality and temporal order relation of the CIs themselves may be considered as the references for defining the causality. For example, the physical host CI on the cloud infrastructure and the virtual host CI created thereon have the mutual hierarchical relation. According to the hierarchical relation, the physical host may influence the virtual hose, but not vice versa. Such a relation is defined as "causality immanent in the CI relation". Further, the "temporal order relation" may mean the temporal order relation between the CI events which occur. For example, when the CI 2 event occurs earlier in time than the CI 1 event, CI 2 becomes a cause CI and CI 1 becomes a result CI. Such a temporal order relation is defined as another causality.

When the two causality application references are applied to express the causality, the causality information in FIG. 11 may be derived. A relation solid line having no directional property in the event correlation information may be expressed as a solid line (arrow) having the directional property. In the present disclosure, a head side of the arrow is defined as "cause event" and a tail side of the arrow is defined as "result event".

Figure 12:
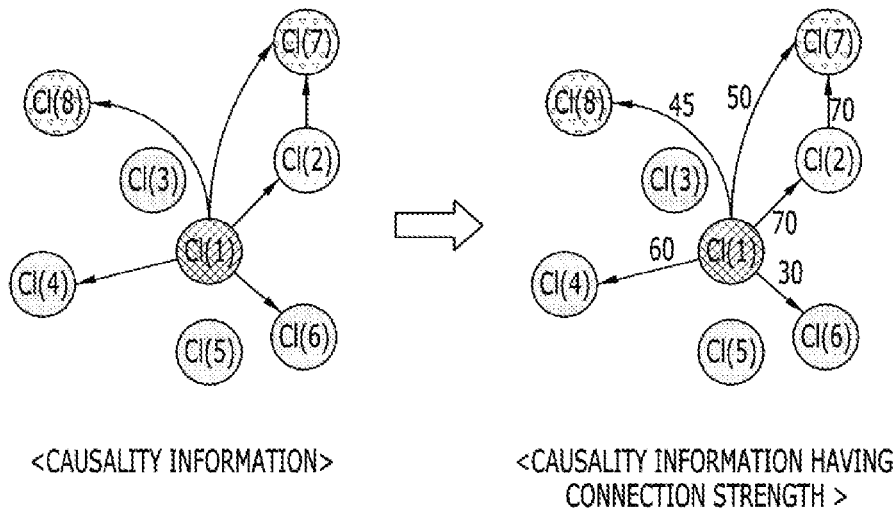
FIG. 12 exemplarily illustrates a connection strength for each connection to which causality is reflected in the event correlation information according to an exemplary embodiment of the present disclosure.

FIG. 12 exemplarily illustrates a connection strength for each connection to which a causality is reflected in the event correlation information according to an exemplary embodiment of the present disclosure.

The respective connections in the causality information having the connection strength in FIG. 12 may include numerical expressions. It may be construed that the larger the numerical value, the larger the connection strength. Therefore, it may be construed that CI 2 (connection strength: 70) among the analysis target events having the hierarchy depth of 1 from the incident CI event (CI 1) have the larger connection strength than other analysis target events (CI 4, CI 6, CI 7, and CI 8). As illustrated in FIG. 12, the event correlation information to which the causality and the connection strength are reflected may be generated and a root cause estimating result may be generated by using the causality and the connection strength.

According to the exemplary embodiments of the present disclosure, the connection strength may numerically express the strength of influence which one CI or CI event exerts on the other one CI or CI event. The root cause may be easily estimated through the connection strength. According to the exemplary embodiments of the present disclosure, various techniques that decide the connection strength may be provided.

The management server 100 may determine whether there is the status change for the CIs related with the analysis target events and acquire change history information including a change time indicating a time when the change occurs when there is the status change, decide a change strength by comparing the change history information and the occurrence time of the incident CI event, and decide the connection strength based on the change strength. Herein, whether the change time is before the occurrence time of the incident CI event is determined and when it is determined that the change time is before the occurrence time of the incident CI event, a difference between the change time and the occurrence time of the incident CI event may be decided. Then, it may be decided that the smaller the difference, the larger the change strength. It may also be decided that the larger the change strength, the larger the connection strength.

The management server 100 may decide whether the respective analysis target events are associated with a predefined explicit event or the potential event sensed by the IT system through statistical data and decide the connection strength so as to have the larger connection strength when the analysis target event is the explicit event than when the analysis target event is the potential event.

The management server 100 may decide the connection strength based on at least one of (a) severity levels of the respective analysis target events, (b) a difference in occurrence time between the analysis target events, (c) proximity between hierarchy depth levels on the CMDB of the analysis target events, and (d) the number of times settled as the root cause of the incident in the related art, Herein, the connection strength is decided as a higher connection strength as the difference in occurrence time between the analysis target events is smaller and decided as the higher connection strength as the proximity between the hierarchy depth levels on the CMDB 240 is higher.

Figure 13:
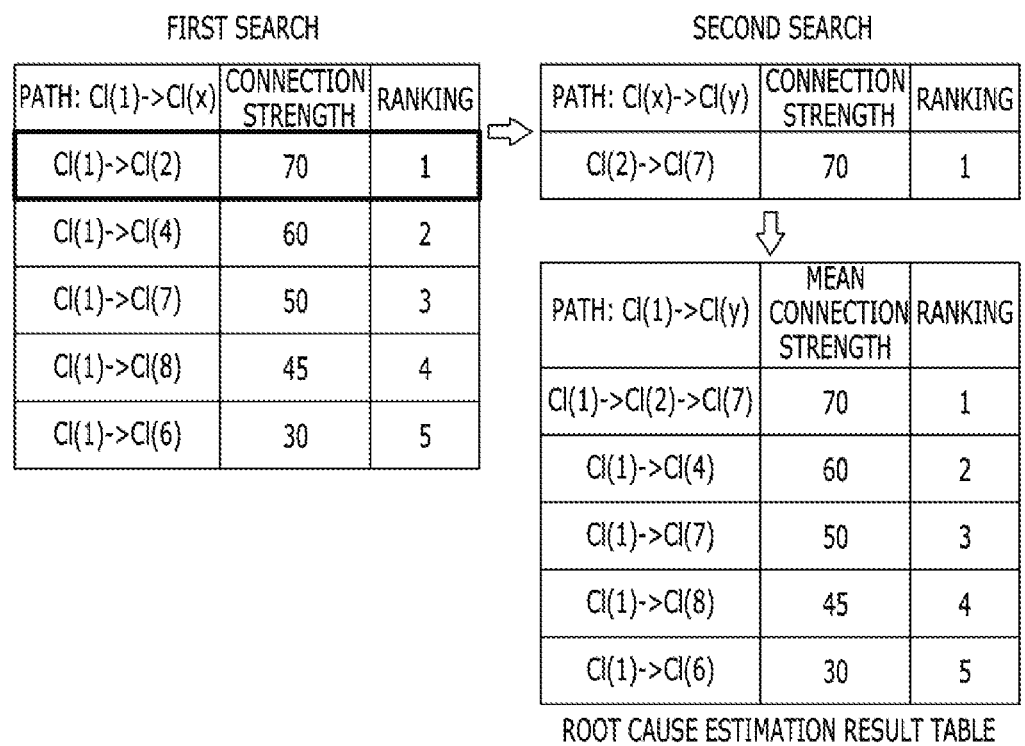
FIG. 13 illustrates exemplary root cause searching and analyzing procedures according to an exemplary embodiment of the present disclosure.

FIG. 13 illustrates exemplary root cause searching and analyzing procedures according to an exemplary embodiment of the present disclosure.

According to the exemplary embodiment of the present disclosure, analyzing a root cause for an incident CI event may include: acquiring the connection strength for each path by performing path searching along the causality for each connection from the incident CI event in the event correlation information; and deciding the CI or CI event which becomes the root cause of the incident CI event based on the connection strength acquired for each path, Herein, the management server 100 may decide or estimate the CI or CI event included in a path having a largest connection strength value is decided as the root cause of the incident CI event by comparing the connection strengths acquired for the respective paths.

According to the exemplary embodiment of the present disclosure, analyzing a root cause for an incident CI event may include: first searching of acquiring a first connection strength for each of first paths by primarily searching the first paths of first analysis target events directly connected with the incident CI event starting from the incident CI event in the event correlation information; second searching of acquiring a second connection strength for each of second paths by secondarily searching the second paths of second analysis target events directly connected with the first analysis target events starting from the first analysis target events; calculating a mean connection strength for the first connection strength and the second connection strength, and deciding the CI or CI event which becomes the root cause of the incident CI event based on the mean connection strength.

According to the exemplary embodiment of the present disclosure, analyzing a root cause for an incident CI event may include: first searching of acquiring a first connection strength for each of first paths by primarily searching the first paths of first analysis target events having a predetermined hierarchy depth from the incident CI event starting from the incident CI event in the event correlation information; second searching of acquiring a second connection strength for each of second paths by secondarily searching the second paths of second analysis target events having the predetermined hierarchy depth from the first analysis target events starting from the first analysis target events; determining whether a search up to a terminal analysis target event included in the event correlation information is completed and terminating the search when it is determined that the search is completed; calculating the mean connection strength for the acquired connection strengths by the unit of a path flow, wherein the path flow includes an overall connection up to the terminal analysis target event linked by one flow from the incident CI event according to a directional property depending on the causality in the event correlation information, and deciding the CI or CI event which becomes the root cause of the incident CI event based on the mean connection strength. Herein, the analyzing of the root cause for the incident CI event may further include ordering the mean connection strength by the unit of the path flow and the deciding of the CI or CI event which becomes the root cause of the incident CI event may include deciding the terminal analysis target event in a path flow having the largest mean connection strength as the CI or CI event which becomes the root cause of the incident CI event based on the ordering result.

When the event correlation information to which the causality and the connection strength are reflected is completed, a process of searching the root cause by selecting a path having an order in which the connection strength is larger may be performed.

A first search process of searching a path directly connected with (that is, immediately reachable to) CI 1 by starting from CI 1 which is the incident CI event may be first performed. For example, the first search process may include a search of CI 1->CI 2, CI 1->CI 4, CI 1->CI 7, CI 1->CI 8, and CI 1->CI 6. A search execution result may be arranged in a descending order based on the connection strength and thereafter, a ranking may be granted from an upper path up to a lower path.

Then, a "second search" of searching the path immediately reachable to (that is, a path to a node directly connected with a terminal node of a first search) by starting the node which reaches in the first search is performed to perform a descending-order arrangement base on the connection strength by the same manner as the first search. For example, the second search may include a search of CI 2->CI 7. The management server 100 may perform the searches again until searching all nodes in the event correlation information ends.

When the search ends, the management server 100 means the connection strength of a path achieved by multiple searches and arranges a final search path in a connection strength descending order to create the root cause estimation result table illustrated in FIG. 13. The root cause estimation result table may serve to recommend the CI or CI event estimated as the root cause to the user as a result acquired by the search. For example, in FIG. 13, an estimation ranking of the root cause is higher in the order of CI 1->CI 2->CI 7. This may mean that there is a high probability that CI 7 will be a root cause CI of CI 1.

Figure 14:
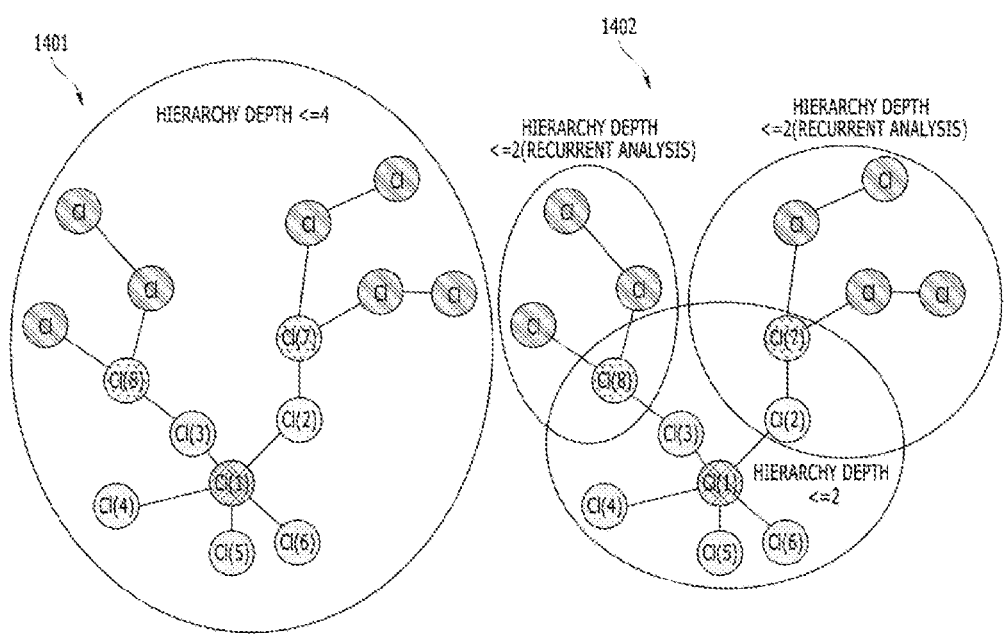
FIG. 14 illustrates exemplary root cause intensive searching and analyzing procedures according to an exemplary embodiment of the present disclosure.

FIG. 14 illustrates exemplary root cause intensive searching and analyzing procedures according to an exemplary embodiment of the present disclosure.

Herein, the intensive analysis may mean an analysis which is additionally performed according to selection by the user (e.g., management monitoring group 400) that receives estimation and analysis results of the root cause.

According to the exemplary embodiment of the present disclosure, the management server 100 may receive a feedback for the root cause analysis of the incident CI event from the user and when the feedback is negative, the management server 100 may decide to increase a predetermined hierarchy depth. After controlling only the hierarchy depth again, the management server 100 may similarly perform steps required for analyzing the root cause.

According to the exemplary embodiment of the present disclosure, the management server 100 may receive the feedback for the root cause analysis of the incident CI event from the user (e.g., management monitoring group 400). Herein, the feedback may include one or more user candidate CIs selected by the user. The management server 100 may decide second candidate CIs having a predetermined hierarchy depth from user candidate CIs based on the CI relation information in the CMDB 240. The management server 100 may identify second candidate events which occur in the second candidate CIs. The management server 100 may decide the occurrence time of each of the second candidate events. The management server 100 may decide one or more second analysis target events among the second candidate events based on the decided occurrence time and generate second event correlation information connecting second analysis target events to each other. The management server 100 may decide causality indicating the directional property for mutual connection of second analysis target events included in second event correlation information based on the CI relation information in the CMDB 240. Then, the management server 100 may analyze the root cause for the incident CI event based on the causality in the second event correlation information again.

As described above, the present disclosure may present two types of new intensive analyses below.

A first intensive analysis technique (1401) means that the analysis is performed again for the first time by readjusting the "hierarchy depth" used for identifying the candidate CI or candidate event in the event correlation analysis.

Reference numeral 1401 of FIG. 14 represents is a diagram graphically expressing that the analysis is reperformed by readjusting the hierarchy depth from 2 to 4. As illustrated in reference numeral 1401 of FIG. 14, in an analysis in which other CIs filtered (that is, removed) by the hierarchy depth of 2 in the related art are reperformed, the CIs may be included in a range of an analysis target.

A second intensive analysis technique (1402) means that the analysis is recursively performed based on candidates selected by the user among the CI candidates or CI events candidates which may become the root cause in the root cause analysis procedure. Reference numeral 1402 of FIG. 14 is a diagram graphically expressing a second intensive analysis performed based on CI 7 and CI 8. As illustrated in reference numeral 1402 of FIG. 14, CIs having the same hierarchy depth (that is, 2) may be decided based on CI 7 and CI 8 and CI 7 and CI 8 become reference points in a manner which is the same as the manner to perform the root cause analysis procedures. In this case, a CI or CI event which is different from a result of a first root cause analysis may be included in the root cause analysis result.

According to the present disclosure, the performance of a computing device can be enhanced by quickly and efficiently analyzing and presenting a root cause for a fault phenomenon which occurs in an IT system. According to the present disclosure, the performance of a computing device can be enhanced by quickly and efficiently determining a potential fault related event in the IT system. According to the present disclosure, the potential fault of the IT system and the root cause of the IT system failure can be efficiently and quickly detected and resolved.

Figure 15:
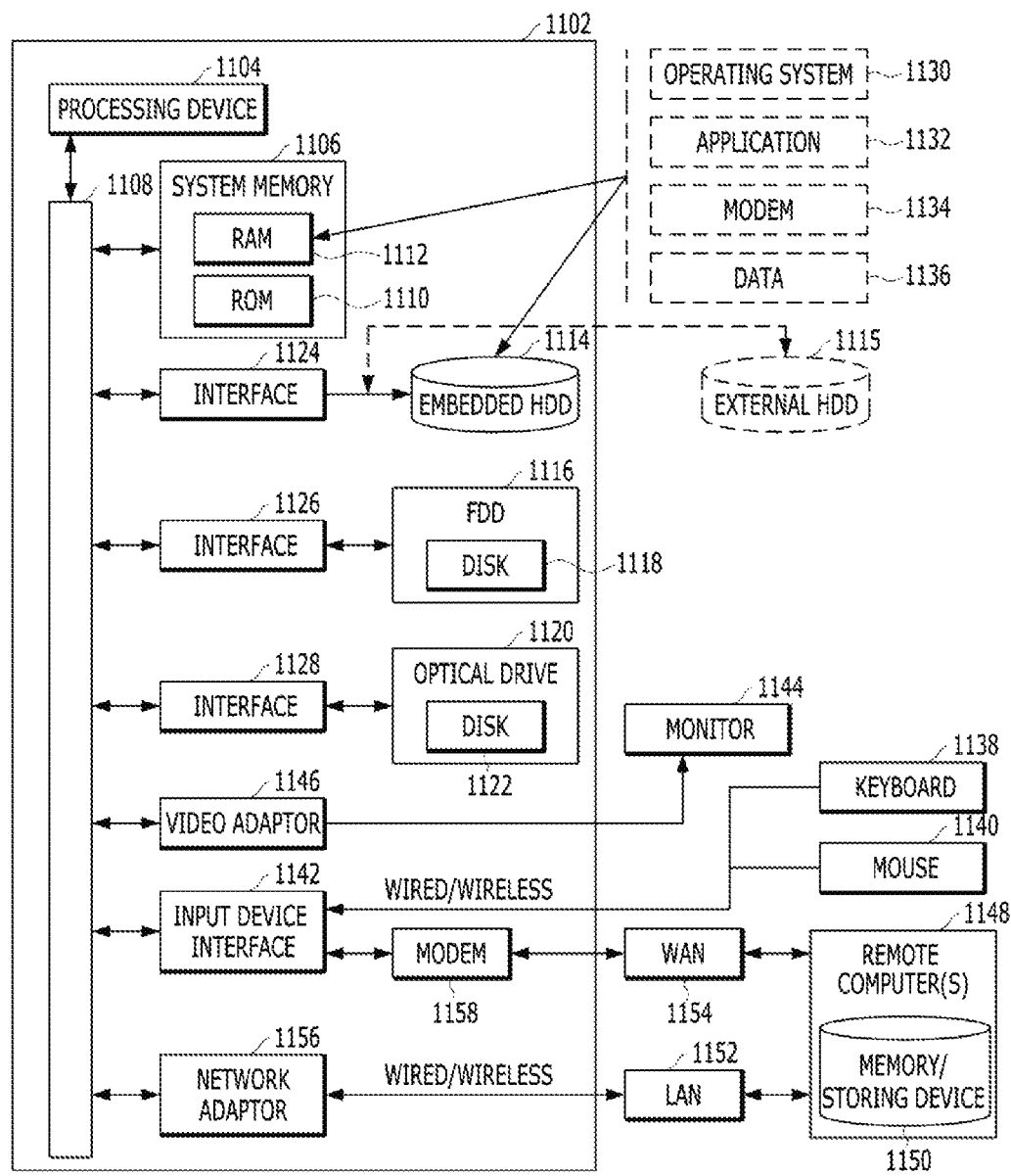
FIG. 15 is a brief and general schematic view of an exemplary computing environment in which exemplary embodiments of the present disclosure may be implemented.

FIG. 15 is a brief and general schematic view of an exemplary computing environment in which exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the module in the present specification includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include both computer readable storage media and computer readable transmission media.

The computer readable storage media include volatile and non-volatile media, temporary or non-temporary media, and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As an example rather than a limit, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an internal hard disk drive (HDD) 1114 (for example, EIDE and SATA), wherein the internal hard disk drive (HDD) 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD), The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an external drive includes, for example, at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

Those skilled in the art of the present disclosure will appreciate that various exemplary logic blocks, modules, processors, means, circuits, and algorithm steps described in association with the embodiments disclosed herein can be implemented by electronic hardware, various types of programs or design codes (designated as "software" herein for easy description), or a combination of all thereof. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. The term "machine-readable media" include a wireless channel and various other media that can store, posses, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. A non-transitory computer-readable medium including a computer program including encoded commands, which is configured to cause one or more processors to perform a process for analyzing a root cause related to an abnormal situation in an IT system when the computer program is executed by the one or more processors of a computer system, wherein the process comprises:

detecting that an incident configuration item (CI) event for at least one of nodes to be monitored in the IT system occurs, wherein the nodes match CIs in a configuration management database (CMDB), respectively and the CMDB includes CIs and CI relation information;

identifying an incident CI related to the incident CI event;

deciding first candidate CIs having a predetermined hierarchy depth from the identified incident CI based on the CI relation information in the CMDB, wherein the hierarchy depth is associated with a distance between the CIs in the CI relation information;

identifying candidate events which occur in the first candidate CIs;

deciding an occurrence time of each of the candidate events;

deciding one or more analysis target events among the candidate events based on the decided occurrence time;

generating event correlation information connecting the one or more analysis target events to each other;

deciding causality indicating a directional property for mutual connection of the one or more analysis target events based on at least one of the CI relation information and the event correlation information in the CMDB; and analyzing a root cause for the incident CI event based on the causality in the event correlation information;
wherein the analysis target events are related to a predefined explicit event or related to a potential event;
wherein the potential event is created by:
collecting performance information data acquired by measuring values of a performance indicator of the at least one of the nodes during a predetermined period,
applying a plurality of windows to the performance information data through window slicing, wherein the plurality of windows includes parts overlapped with an adjacent window,
calculating a statistical representative value for each of the plurality of windows, and
at least one of:
generating normal distribution data of the statistical representative values for the plurality of windows and comparing the normal distribution data with the statistical representative value for a new data group to which a new window is applied,
comparing the statistical representative values for the plurality of windows with the statistical representative value for the new data group to which the new window is applied by using a k-nearest neighbor (kNN) algorithm, and
deciding the statistical representative value for a future window by using the statistical representative values for the plurality of windows as inputs for a recurrent neural network (RNN) and comparing the statistical representative value for the future window with the statistical representative value for the new data group to which the new window is applied.

2. The non-transitory computer-readable medium of claim 1, wherein the deciding the one or more analysis target events includes comparing the occurrence time of each of the candidate events and the occurrence time of the incident CI event with each other to decide candidate events in which a comparison result is within a predetermined difference value of the one or more analysis target events.

3. The non-transitory computer-readable medium of claim 1, wherein the deciding the causality includes:
analyzing the CI relation information in the CMDB to derive an immanent causality which immanently exists in a relation between the CIs related to the one or more analysis target events,
deciding a temporal order relation for the one or more analysis target event by deciding the occurrence time of the one or more analysis target events, and
deciding the causality based on the immanent causality and the temporal order relation,
wherein the analysis target event which occurs earlier in time is decided as a cause event and the analysis target event which occurs later in time is decided as a result event, in the causality.

4. The non-transitory computer-readable medium of claim 3, wherein in the deciding the causality, a higher weight is granted to the immanent causality than to the temporal order relation.

5. The non-transitory computer-readable medium of claim 1, wherein the process further comprises deciding a connection strength representing a strength of influence which the cause event among the one or more analysis target events having the causality exerts on the result event, and
the analyzing the root cause for the incident CI event including analyzing the root cause for the incident CI event based on the causality and the connection strength in the event correlation information.

6. The non-transitory computer-readable medium of claim 5, wherein the deciding the connection strength includes:
determining whether there is a status change for the CIs related to the one or more analysis target events and acquiring change history information including a change time indicating a time when the status change occurs,
deciding a change strength by comparing the change history information and the occurrence time of the incident CI event, and deciding the connection strength based on the change strength.

7. The non-transitory computer-readable medium of claim 6, wherein the deciding the change strength includes:
determining whether the change time is before the occurrence time of the incident CI event and when it is determined that the change time is before the occurrence time of the incident CI event, deciding a difference between the change time and the occurrence time of the incident CI event, and
deciding the change strength where the smaller the difference, the larger the change strength.

8. The non-transitory computer-readable medium of claim 5, wherein the deciding the connection strength includes:
deciding whether each of the one or more analysis target events is related to a predefined explicit event or related to a potential event sensed by the IT system through statistical data, and
deciding the connection strength to have a larger connection strength when the each of the one or more analysis target event is the explicit event than when the each of the one or more analysis target event is the potential event.

9. The non-transitory computer-readable medium of claim 5, wherein the connection strength is decided based on at least one of severity levels of the respective one or more analysis target events, a difference in the occurrence time between the one or more analysis target events, proximity between hierarchy depth levels on the CMDB of the one or more analysis target events, and a number of times settled as the root cause for the incident CI event.

10. The non-transitory computer-readable medium of claim 9, wherein the connection strength is decided as a large connection strength when the difference in the occurrence time between the one or more analysis target events is smaller, and decided as a larger connection strength when the proximity between the hierarchy depth levels on the CMDB is higher.

11. The non-transitory computer-readable medium of claim 5, wherein the process further comprises reflecting the causality and the connection strength to the event correlation information after deciding the causality and the connection strength.

12. The non-transitory computer-readable medium of claim 5, wherein the analyzing the root cause for the incident CI event includes:
acquiring the connection strength for each path by performing path searching along the causality for each connection from the incident CI event in the event correlation information, and
deciding a CI or CI event which becomes the root cause of the incident CI event based on the connection strength acquired for the each path.

13. The non-transitory computer-readable medium of claim 12, wherein in the deciding the CI or CI event which becomes the root cause of the incident CI event,
the CI or CI event included in a path having a largest connection strength value is decided as the root cause of the incident CI event by comparing the connection strength acquired for the each path.

14. The non-transitory computer-readable medium of claim 5, wherein the analyzing the root cause for the incident CI event includes:
    a first searching of acquiring a first connection strength for each of first paths by primarily searching the first paths of first analysis target events directly connected with the incident CI event starting from the incident CI event in the event correlation information,
    a second searching of acquiring a second connection strength for each of second paths by secondarily searching the second paths of second analysis target events directly connected with the first analysis target events starting from the first analysis target events,
    calculating a mean connection strength for the first connection strength and the second connection strength, and
    deciding a CI or CI event which becomes the root cause of the incident CI event based on the mean connection strength.

15. The non-transitory computer-readable medium of claim 5, wherein the analyzing the root cause for the incident CI event includes:
    a first searching of acquiring a first connection strength for each of first paths by primarily searching the first paths of first analysis target events having a predetermined hierarchy depth from the incident CI event starting from the incident CI event in the event correlation information,
    a second searching of acquiring a second connection strength for each of second paths by secondarily searching the second paths of second analysis target events having the predetermined hierarchy depth from the first analysis target events starting from the first analysis target events,
    determining whether a search up to a terminal analysis target event included in the event correlation information is completed and terminating the search when it is determined that the search is completed,
    calculating a mean connection strength for the acquired first and second connection strengths by the unit of a path flow, wherein the path flow includes an overall connection up to the terminal analysis target event linked by one flow from the incident CI event according to a directional property depending on the causality in the event correlation information, and
    deciding a CI or CI event which becomes the root cause of the incident CI event based on the mean connection strength.

16. The non-transitory computer-readable medium of claim 15, wherein the analyzing the root cause for the incident CI event further comprises ordering the mean connection strength by the unit of the path flow, and
    the deciding the CI or CI event which becomes the root cause of the incident CI event including deciding the terminal analysis target event in the path flow having the largest mean connection strength as the CI or CI event which becomes the root cause of the incident CI event based on the ordering result.

17. The non-transitory computer-readable medium of claim 1, wherein the process further comprises:
    receiving a feedback for analysis of the root cause of the incident CI event from a user, and
    deciding to increase the predetermined hierarchy depth when the feedback is negative.

18. The non-transitory computer-readable medium of claim 1, wherein the process further comprises:
    receiving a feedback for analysis of the root cause of the incident CI event from a user, wherein the feedback includes one or more user candidate CIs selected by the user;
    deciding second candidate CIs having a predetermined hierarchy depth from the one or more user candidate CIs based on the CI relation information in the CMDB;
    identifying second candidate events which occur in the second candidate CIs;
    deciding the occurrence time of each of the second candidate events;
    deciding one or more second analysis target events among the second candidate events based on the decided occurrence time;
    generating second event correlation information connecting the one or more second analysis target events to each other;
    deciding causality indicating a directional property for mutual connection of the one or more second analysis target events included in the second event correlation information based on the CI relation information in the CMDB; and
    analyzing the root cause for the incident CI event based on the causality in the second event correlation information.

19. A computer-implemented method for analyzing a root cause related to an abnormal situation in an IT system, which is performed by a computing device, the method comprising:
    detecting that an incident configuration item (CI) event for at least one of nodes to be monitored in the IT system occurs, wherein the nodes match CIs in a configuration management database (CMDB), respectively and the CMDB includes CIs and CI relation information;
    identifying an incident CI related to the incident CI event;
    deciding candidate CIs having a predetermined hierarchy depth from the identified incident CI based on the CI relation information in the CMDB, wherein the hierarchy depth is associated with a distance between the CIs in the CI relation information;
    identifying candidate events which occur in the candidate CIs;
    deciding an occurrence time of each of the candidate events;
    deciding one or more analysis target events among the candidate events based on the decided occurrence time;
    generating event correlation information connecting the one or more analysis target events to each other;
    deciding causality indicating a directional property for mutual connection of the one or more analysis target events included in the event correlation information based on the CI relation information in the CMDB; and
    analyzing a root cause for the incident CI event based on the causality in the event correlation information;
    wherein the analysis target events are related to a predefined explicit event or related to a potential event;
    wherein the potential event is created by:
    collecting performance information data acquired by measuring values of a performance indicator of the at least one of the nodes during a predetermined period,
    applying a plurality of windows to the performance information data through window slicing, wherein the plurality of windows includes parts overlapped with an adjacent window, calculating a statistical representative value for each of the plurality of windows, and at least one of:

generating normal distribution data of the statistical representative values for the plurality of windows and comparing the normal distribution data with the statistical representative value for a new data group to which a new window is applied, comparing the statistical representative values for the plurality of windows with the statistical representative value for the new data group to which the new window is applied by using a k-nearest neighbor (kNN) algorithm, and deciding the statistical representative value for a future window by using the statistical representative values for the plurality of windows as inputs for a recurrent neural network (RNN) and comparing the statistical representative value for the future window with the statistical representative value for the new data group to which the new window is applied.

20. A management server for analyzing a root cause related to an abnormal situation in an IT system, the management server comprising:

memory; and at least one processor connected to the memory, wherein the at least one processor is configured to:

detect that an incident configuration item (CI) event for at least one of nodes to be monitored in the IT system occurs, wherein the nodes match CIs in a configuration management database (CMDB), respectively and the CMDB includes CIs and CI relation information;

identify an incident CI related to the incident CI event;

decide candidate CIs having a predetermined hierarchy depth from the identified incident CI based on the CI relation information in the CMDB, wherein the hierarchy depth is associated with a distance between the CIs in the CI relation information;

identify candidate events which occur in the candidate CIs;

decide an occurrence time of each of the candidate events;

decide one or more analysis target events among the candidate events based on the decided occurrence time;

generate event correlation information connecting the one or more analysis target events to each other;

decide causality indicating a directional property for mutual connection of the one or more analysis target events included in the event correlation information based on the CI relation information in the CMDB; and analyze a root cause for the incident CI event based on the causality in the event correlation information;

wherein the analysis target events are related to a predefined explicit event or related to a potential event;

wherein the potential event is created by:

collecting performance information data acquired by measuring values of a performance indicator of the at least one of the nodes during a predetermined period, applying a plurality of windows to the performance information data through window slicing, wherein the plurality of windows includes parts overlapped with an adjacent window, calculating a statistical representative value for each of the plurality of windows, and at least one of:

generating normal distribution data of the statistical representative values for the plurality of windows and comparing the normal distribution data with the statistical representative value for a new data group to which a new window is applied, comparing the statistical representative values for the plurality of windows with the statistical representative value for the new data group to which the new window is applied by using a k-nearest neighbor (kNN) algorithm, and deciding the statistical representative value for a future window by using the statistical representative values for the plurality of windows as inputs for a recurrent neural network (RNN) and comparing the statistical representative value for the future window with the statistical representative value for the new data group to which the new window is applied.

* * * * *